US012803800B2

(12) United States Patent
Aldweesh

(10) Patent No.: US 12,803,800 B2
(45) Date of Patent: Nov. 17, 2026

(54) BLOCKCHAIN-BASED AUTHENTICATION SYSTEM AND METHOD FOR AUTHENTICATING ELECTRIC VEHICLES OR DRONES IN A SMART CITY

(71) Applicants: Amjad Aldweesh, Shaqra (SA); Shaqra University, Shaqra (SA)

(72) Inventor: Amjad Aldweesh, Shaqra (SA)

(73) Assignee: Shaqra University, Shaqra (SA)

( * ) Notice: Subject to any disclaimer, the term of this patent is extended or adjusted under 35 U.S.C. 154(b) by 96 days.

(21) Appl. No.: 19/094,254

(22) Filed: Mar. 28, 2025

(65) Prior Publication Data

US 2025/0233743 A1 Jul. 17, 2025

(51) Int. Cl.

| | |
|---|---|
| ***H04L 9/40*** | (2022.01) |
| ***H04L 9/08*** | (2006.01) |
| ***H04L 9/14*** | (2006.01) |
| ***H04L 9/32*** | (2006.01) |

(52) U.S. Cl.

CPC .............. *H04L 9/14* (2013.01); *H04L 9/3242* (2013.01); *H04L 9/3247* (2013.01); *H04L 63/166* (2013.01)

(58) Field of Classification Search

CPC ....... H04L 9/14; H04L 63/166; H04L 9/3242; H04L 9/3247

See application file for complete search history.

(56) References Cited

U.S. PATENT DOCUMENTS

| | | | | |
|---|---|---|---|---|
| 2021/0091956 | A1* | 3/2021 | Mullett | G06F 8/71 |
| 2022/0318833 | A1* | 10/2022 | Qian | G06F 16/27 |
| 2025/0337580 | A1* | 10/2025 | Radman | G06Q 20/38215 |

* cited by examiner

*Primary Examiner* — Hany S. Gadalla

(74) *Attorney, Agent, or Firm* — Perilla Knox & Hildebrandt; Kenneth A. Knox

(57) ABSTRACT

The present disclosure relates to a blockchain-based authentication system for electric vehicles and drones, and a method for authenticating electric vehicles or drones in a smart city. The proposed blockchain-based authentication system enhances security, privacy, and scalability for electric vehicles (EVs) and drones in smart city environments. It employs a consortium blockchain managed by city authorities and stakeholders, utilizing smart contracts for identity registration, credential issuance, and access control. Device nodes store cryptographic keys securely, while an optional authentication server facilitates off-chain integration. The authentication operation of the system includes, ensuring tamper-proof identity verification through on-chain validation. Authentication attempts are immutably recorded for auditing and anomaly detection. By eliminating single points of failure and strengthening data privacy, this decentralized authentication framework offers a scalable and secure solution for integrating EVs and drones into smart city infrastructures.

19 Claims, 9 Drawing Sheets

| Number of Requests | Average Latency (ms) | Std. Deviation (ms) | Throughput (req/s) |
|---|---|---|---|
| 100 | 210 | 15 | 476 |
| 500 | 315 | 22 | 427 |
| 1,000 | 430 | 35 | 355 |
| 1,500 | 610 | 44 | 295 |
| 2,000 | 820 | 60 | 248 |

Figure 7

| Security parameter | Outcome |
|---|---|
| Spoofing Attempts Detected | 100 % |
| Replay Attacks Prevented | 100 % |
| Man-in-the-Middle Interceptions | No successful intrusions |
| Unauthorized Access Incidents | 0 |

Figure 8

| System | Centralization | Security | Scalability | Privacy |
| --- | --- | --- | --- | --- |
| Centralized (Traditional) | High | Medium | Medium | Low |
| Edge-Based Authentication | Partial | Medium | High | Medium |
| Proposed Blockchain-Based System | Low | High | Medium-High | High |

Figure 9

BLOCKCHAIN-BASED AUTHENTICATION SYSTEM AND METHOD FOR AUTHENTICATING ELECTRIC VEHICLES OR DRONES IN A SMART CITY

TECHNICAL FIELD

The present disclosure relates to an authentication system for vehicle and drones, specifically to a Blockchain-based authentication system for electric vehicle and drones. The present disclosure further relates to a method for authenticating electric vehicles or drones in a smart city. The present disclosure aims to enhance security, privacy, and scalability in smart cities.

BACKGROUND

Electric vehicles are the cleaner alternatives to the traditional internal combustion engine, as they contribute to the climate change mitigation efforts, while drones provides flexibility and speed in various common applications such as package delivery, infrastructure monitoring, and public safety. Due to these beneficial properties of both electric vehicle and drones, both are adopted in urban environment for development of more connected, data driven smart cities.

The integration of electric vehicle and drones with the smart cities, provides an innovative mobility solution, resulting in efficient logistics and transportation systems. However the integration of these devices into smart city ecosystem poses new security and privacy risks. Both Electric vehicles and drones rely on the wireless communication channels for the data exchange, which makes them vulnerable to cyber-attacks such as spoofing, eavesdropping, and unauthorized access. Furthermore, the sensitive data stored and transmitted—ranging from vehicle location data to user personal information—can be subject to misuse, leading to issues of trust and privacy. As the number of EVs and drones scales upward, traditional centralized authentication systems face bottlenecks and may not be robust enough to handle the computational and communication demands of increasingly connected systems.

In order to address aforementioned challenges with the existing authentication systems for electric vehicles and drone, there is a need for a robust authentication system that exhibit dynamic capabilities to adapt itself with growth and complexity of devices in smart cities.

The blockchain technology offers a promising platform for decentralized and secure data management, wherein said technology provides core features such as immutability, consensus mechanisms, and cryptographic security, making it suitable for authentication tasks in complex, distributed environment. Based on this technology, the present disclosure provides a blockchain-based authentication system for electric vehicle and drones, and a method for authentication the electric vehicle and drones in a smart city, wherein the system exhibits a decentralized architecture that leverages blockchain technology for overcoming the limitations of centralized systems.

BRIEF SUMMARY

The present disclosure relates to a Blockchain-based authentication system for electric vehicle and drones. The proposed system leverages the decentralized nature of blockchain to eliminate single points of failure and uses smart contracts for automated identity management. By integrating cryptographic techniques such as public-key infrastructure, hashing, and pseudonymization, the framework of the proposed system ensures robust security and privacy protection. The proposed system offers viability of the solution in scenarios involving both electric vehicle charging infrastructure and drone flight authorization. Testing results indicate that the system maintains low latency and high throughput under varying network conditions, while effectively mitigating common security threats like spoofing and unauthorized access. The present disclosure aims to enhance operational integrity, foster user trust, and enable large-scale integration of next-generation mobility solutions within smart cities. The findings from this disclosure suggest that decentralized authentication mechanisms can be pivotal for sustainable urban development, serving as a blueprint for broader applications in healthcare, e-governance, and beyond.

The present disclosure seeks to provide a Blockchain-based authentication system for electric vehicle and drones. The system comprises: a consortium blockchain network managed by a plurality of registered users, said consortium blockchain network configured to store records of authorized device identities; a plurality of smart contracts coupled to the consortium blockchain network configured to implement identity registration, credential issuance, and access control logic for devices within the smart city environment, said smart contracts comprising, a registration module configured to register a device on the consortium blockchain network, create a unique device identity, and generate a corresponding public-private key pair, and a credential issuance module, implemented by smart contracts coupled to the blockchain network, configured to issue credentials linking the device's public key to its registered identity, and store the credentials on a cloud server; a plurality of device nodes coupled to the plurality of smart contracts, each device node comprising a vehicle or a drone, said device node configured to operate as a node in the consortium blockchain network and include an onboard module for secure key storage and blockchain interaction; an authentication server interconnected to the consortium blockchain network and the plurality of device nodes and configured to perform off-chain interactions, including data analytics, without undermining decentralized authentication logic implemented by the consortium blockchain network and smart contracts, wherein said authentication server comprises, an authentication request module, coupled to the device, configured to generate an authentication request by signing the request using the device's private key and attaching metadata; and an on-chain verification module, coupled to the network nodes of the blockchain network and implemented by smart contracts, configured to grant or deny access based on a generated authentication result, wherein said authentication result is generated upon validating a digital signature of the authentication request against the public key recorded on the blockchain network; and a user interface connected to the consortium blockchain network to manage device credentials, monitor system status within the consortium blockchain network, and interact with the authentication system.

The present disclosure also seeks to provide a blockchain-based authentication method for a smart city environment. The method comprises: storing records of authorized device identities on a consortium blockchain network managed by a plurality of registered users; registering a device on a blockchain network, creating a unique device identity, and generating a corresponding public-private key pair; issuing credentials, using a plurality of smart contracts coupled to the blockchain network, that link the device's public key to its registered identity, and storing the credentials on a cloud server; operating a plurality of device nodes, each device node comprising a vehicle or a drone, as nodes within the consortium blockchain network; securing key storage and blockchain interaction at each device node using an onboard module; performing off-chain interactions, including data analytics, using an optional authentication server, wherein the off-chain interactions do not undermine decentralized authentication logic implemented by the consortium blockchain network and smart contracts; generating an authentication request at the device by signing the request using the device's private key and attaching metadata using an authentication request module; granting or denying access based on a generated authentication result by using an on-chain verification module, wherein said authentication result is generated upon verifying the authentication request on-chain by validating a digital signature of the authentication request against the public key recorded on the blockchain network by network nodes; logging the authentication attempt on the blockchain network; immutably recording authentication attempts on the blockchain network and providing the registered user access to review logs for anomaly detection and auditing; and managing device credentials, monitoring system status within the consortium blockchain network, and interacting with the authentication system via a user interface by the registered user.

An object of the present disclosure is to provide a Blockchain-based authentication system for electric vehicle and drones.

Another object of the present disclosure is to provide a blockchain-based authentication system for electric vehicle and drones, to provide robust security and privacy protection by eliminating single points of failure, using smart contracts for automated identity management, and integrating cryptographic techniques such as public-key infrastructure, hashing, and pseudonymization.

Another object of the present disclosure is to propose a decentralized architecture that leverages blockchain technology to overcome the limitations of centralized systems.

Another object of the present disclosure is to demonstrate the feasibility and effectiveness of the proposed solution through a prototype implementation and testing.

Yet, another object of the present disclosure is to analyse the performance of the system under common cyberattack scenarios, varying network loads, and large scale deployments.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein:

FIG. 7 illustrates a table describing the average latency and throughput measured during tests with increasing numbers of concurrent authentication requests;

FIG. 8 illustrates a Table highlighting the key security metrics observed; and FIG. 9 illustrates a Table showing the comparative analysis between the proposed solution and several existing authentication systems.

Figure 1:
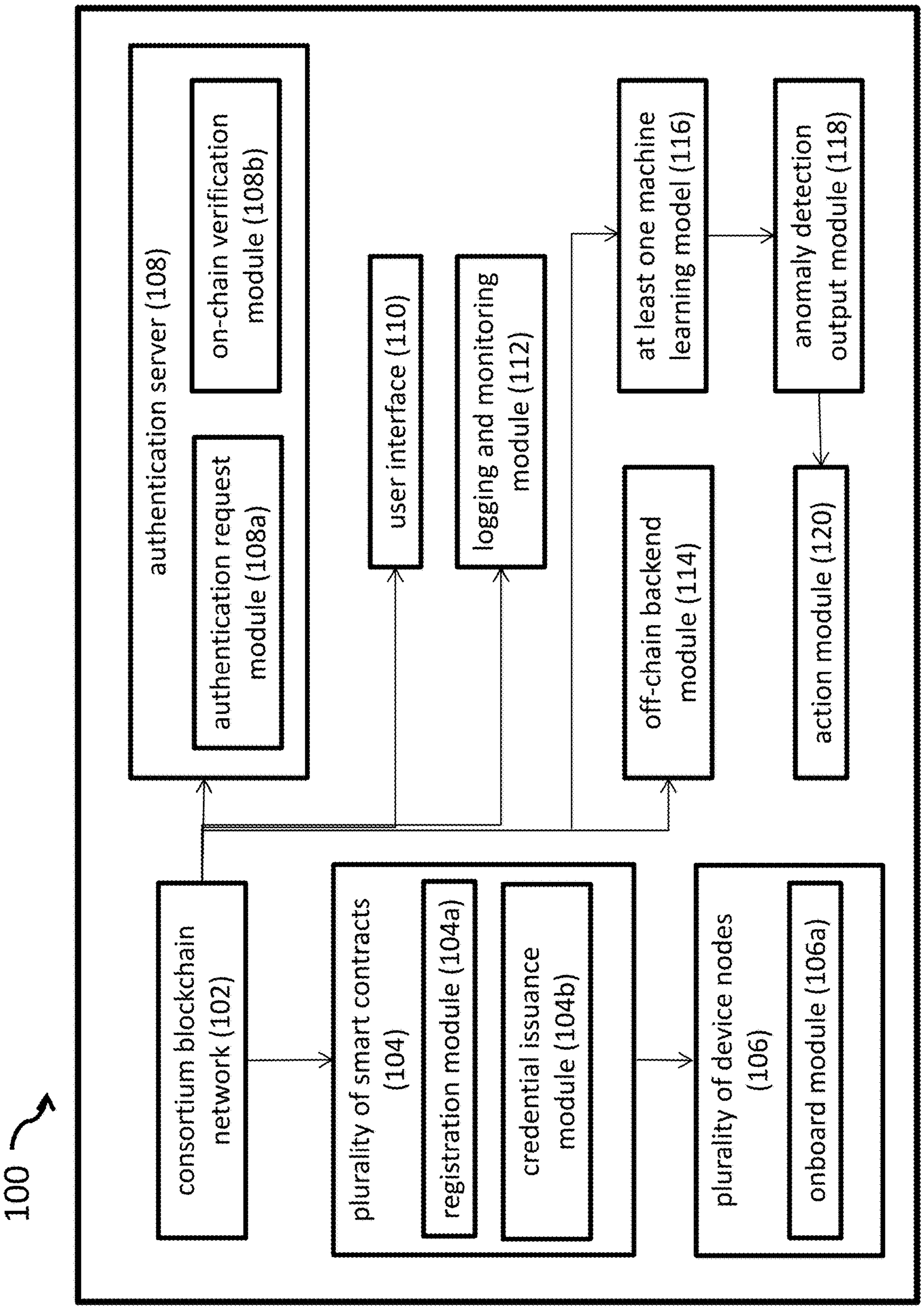
FIG. 1 illustrates a block diagram of a blockchain-based authentication system for authenticating an electric vehicle or a drone in a smart city in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the present disclosure will be described below in detail with reference to the accompanying drawings.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VOIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The present disclosure relates to a blockchain-based authentication system for electric vehicle and drones. The proposed system includes a decentralized architecture integrated with blockchain technology in order to overcome the limitations of centralized systems for device identity verification, wherein relying on centralized authorities can introduce single point of failure and resource bottlenecks, posing significant risks to system reliability. The proposed system is integrated with cryptographic techniques such as public-key infrastructure, hashing, and pseudonymization for ensuring robust security and privacy protection. The disclosure aims to enhance operational integrity, foster user trust, and enable large-scale integration of next-generation mobility solutions within smart cities.

FIG. 1 illustrates a block diagram of a blockchain-based authentication system for authenticating an electric vehicle or a drone in a smart city in accordance with an embodiment of the present disclosure.

Referring to FIG. 1, the authentication system (100) includes: a consortium blockchain network (102) managed by a plurality of registered users, said consortium blockchain network (102) configured to store records of authorized device identities; a plurality of smart contracts (104) coupled to the consortium blockchain network (102) configured to implement identity registration, credential issuance, and access control logic for devices within the smart city environment, said smart contracts (104) comprising, a registration module (104*a*) configured to register a device on the consortium blockchain network (102), create a unique device identity, and generate a corresponding public-private key pair, and a credential issuance module (104*b*), implemented by smart contracts (104) coupled to the blockchain network (102), configured to issue credentials linking the device's public key to its registered identity, and store the credentials on a cloud server; a plurality of device nodes (106) coupled to the plurality of smart contracts (104), each device node (106) comprising a vehicle or a drone, said device node (106) configured to operate as a node in the consortium blockchain network (102) and include an onboard module (106*a*) for secure key storage and blockchain interaction; an authentication server (108) interconnected to the consortium blockchain network (102) and the plurality of device nodes (106) and configured to perform off-chain interactions, including data analytics, without undermining decentralized authentication logic implemented by the consortium blockchain network (102) and smart contracts (104), wherein said authentication server (108) comprises, an authentication request module (108*a*), coupled to the device (106), configured to generate an authentication request by signing the request using the device's private key and attaching metadata, and an on-chain verification module (108*b*), coupled to the network nodes of the blockchain network (102) and implemented by smart contracts (104), configured to grant or deny access based on a generated authentication result, wherein said authentication result is generated upon validating a digital signature of the authentication request against the public key recorded on the blockchain network (102); and a user interface (110) connected to the consortium blockchain network (102) to manage device credentials, monitor system status within the consortium blockchain network, and interact with the authentication system (100).

In an embodiment, the metadata attached to the authentication request by the authentication request module (108*a*) comprises time stamps and a device identifier.

In an embodiment, the on-chain verification module (108*b*) receives the authentication request and the digital signature from the electric vehicle/drone (106), and retrieves the public key associated with the electric vehicle or drone from the blockchain network (102) thereby calculates a first cryptographic hash of the authentication request to decrypt the digital signature using the retrieved public key to obtain a second cryptographic hash and compare the first cryptographic hash with the second cryptographic hash thereby determines the validity of the authentication request based on the comparison result, wherein the authentication request is validated if the first cryptographic hash matches the second cryptographic hash.

In an embodiment, the system (100) further comprises a logging and monitoring module (112) configured to immutably record authentication attempts on the blockchain network (102) and provide a registered user access to review logs for anomaly detection and auditing, wherein the blockchain network (102) operates using a consensus mechanism selected from the group consisting of Proof of Stake (POS), Byzantine Fault Tolerance (BFT), Proof of Authority (PoA), or any hybrid mechanism optimizing for security, energy efficiency, and scalability.

In an embodiment, the consortium blockchain network (102) further comprises a distributed ledger (102*a*) configured to record device data and access control information.

In an embodiment, the system (100) further comprises an off-chain backend module (114) communicatively coupled to a granted blockchain platform and configured to implement business logic for device management and monitoring, and provide the user interface (110) for device management and monitoring. In an example, the granted blockchain platform is Hyperledger Fabric, wherein the Hyperledger Fabric blockchain platform further comprises membership services for managing registered users in the granted blockchain network.

In an embodiment, the access can be granted or denied based on a set of predefined authentication policies, wherein said policies are selected from a group of a user with registered EVs/drones (106) with valid digital certificates or unique identifiers, the user of the EV/drone must provide valid credentials linked to their registered identity, different roles have varying levels of access to system resources and functionalities, access is granted or denied based on the time of day or day of the week and based on the EV/drone's location, access is influenced by the device's or user's past transaction history and reputation score, and access may be restricted based on the health and status of the EV/drone.

In an embodiment, the system (100) further comprises: at least one machine learning model (116), operably coupled to the blockchain data interface and configured to receive authentication data from the blockchain data interface, analyze the authentication data to establish a baseline of normal authentication patterns, and detect deviations from the baseline indicative of anomalous authentication patterns; and an anomaly detection output module (118), operably coupled to the at least one machine learning model (116) and configured to generate an alert in real-time upon detection of anomalous authentication patterns. The authentication data comprises transaction patterns, user behavior patterns, access patterns, or a combination thereof within the blockchain, wherein the anomaly detection output module (118) is further configured to generate an alert comprising details of the anomalous authentication pattern, selected from stored timestamps, user identifiers, and transaction details.

In an embodiment, the system (100) further comprises an action module (120), operably coupled to the anomaly detection output module (118), and configured to automatically trigger a security action in response to the generated alert.

In one embodiment, the modules of the system—including the registration module, credential issuance module, authentication server, on-chain verification module, device nodes, logging and monitoring module, machine learning model, and anomaly detection output module—are implemented using dedicated hardware components suited to their respective operational roles. The registration module and credential issuance module, both implemented via smart contracts coupled to the consortium blockchain network, are executed on blockchain validator nodes equipped with secure processing hardware and persistent ledger storage, capable of performing deterministic operations within a decentralized execution environment. The authentication server comprises one or more processing devices, such as multi-core CPUs or edge servers, coupled with volatile and non-volatile memory units, configured to handle off-chain data analytics, policy evaluations, and metadata processing. The device nodes, representing electric vehicles or drones, incorporate onboard secure elements, such as Trusted Platform Modules (TPMs) or Hardware Security Modules (HSMs), for private key storage, and are equipped with embedded processors for local blockchain interaction and authentication request generation. The on-chain verification module, implemented as a smart contract, operates on blockchain nodes with specialized consensus logic processors and state synchronization memory for real-time credential validation. The logging and monitoring module resides on the distributed ledger, supported by immutable storage devices and consensus-enforcing compute nodes to ensure tamper-proof recording. The machine learning model and the anomaly detection output module are deployed on either cloud-hosted GPUs, AI accelerators, or edge-based inference hardware, depending on network architecture, and are configured to process authentication data streams to detect anomalous access behavior.

In an embodiment, the registration module is configured to initiate a device registration sequence comprising: generating a blockchain-based nonce using a deterministic pseudorandom function linked to a block header hash of the latest confirmed block; transmitting the nonce to the device node over a secure channel established using the Transport Layer Security (TLS) protocol with mutual authentication; receiving, from the device node, a signed nonce response generated by encrypting the nonce using a private key stored in a hardware security module (HSM) within the device node; verifying the authenticity of the signed nonce response by invoking a smart contract that retrieves the public key associated with the device identity from the blockchain ledger and performs an elliptic curve digital signature verification (ECDSA) operation; and permitting registration completion only upon successful validation of the signature, the integrity of a firmware hash transmitted during registration, and correlation of the device identifier with a manufacturer-issued root certificate stored on-chain.

In one exemplary embodiment, the registration module is designed to perform a robust, tamper-resistant device registration sequence by integrating blockchain-derived randomness, hardware-based security, and smart contract-enabled cryptographic validation. The process begins with the generation of a nonce—a one-time, unpredictable challenge—using a deterministic pseudorandom function (PRF). This PRF is seeded with the block header hash of the most recent confirmed block on the blockchain ledger, ensuring that the nonce is both verifiably tied to the current blockchain state and is resistant to replay or prediction attacks. This cryptographically secure nonce is transmitted to the device node over a secure communication channel implemented using Transport Layer Security (TLS) with mutual authentication, which guarantees that both the server and the device validate each other's certificates and establish a trusted encrypted tunnel.

Upon receiving the nonce, the device node responds by generating a signed nonce response. The device encrypts the nonce using its private key, which is securely stored within an embedded hardware security module (HSM). The use of an HSM guarantees protection against private key extraction through physical tampering or software compromise. Once the signed nonce is sent back, the registration module initiates a validation process by invoking a smart contract hosted on the blockchain. This smart contract retrieves the device's registered public key, which is indexed to the device identity and stored immutably on-chain, and then performs an elliptic curve digital signature algorithm (ECDSA) verification to ensure that the signed nonce corresponds to the original nonce and that it was signed using the expected private key.

In addition to verifying the signed nonce, the registration sequence mandates integrity checks on the firmware by requiring the device to transmit a cryptographic hash (e.g., SHA-256) of its firmware during registration. This hash is compared against a pre-approved firmware hash list or matched with expected hashes derived from manufacturer data stored on-chain. Furthermore, the registration is permitted to proceed only if the device identifier—typically a unique hardware ID or a manufacturer-defined serial number—can be correlated to a root certificate issued by a trusted manufacturer. This root certificate, also stored in the blockchain's certificate registry, anchors the device's trustworthiness to a known authority and prevents rogue or cloned devices from being enrolled.

For instance, consider a smart meter seeking registration in a decentralized energy management system. The backend registration module pulls the latest Ethereum block hash, uses it to generate a nonce, and transmits it securely over TLS to the meter. The meter signs it using a key within its TPM-based HSM. The backend smart contract retrieves the meter's public key from the blockchain, performs ECDSA verification, checks the firmware hash against approved hashes for that meter type, and ensures the meter ID matches a registered manufacturer root certificate. Only when all these steps pass is the meter's registration considered successful and its credentials activated for use in future authenticated sessions. This embodiment ensures high integrity, non-repudiation, and tamper-proof registration suitable for critical infrastructures and zero-trust environments.

In an embodiment, the credential issuance module is configured to issue credentials using a smart contract-based Merkle proof generation logic, comprising: receiving, from a registered authority node, a credential issuance request comprising a device public key and a set of contextual parameters including permitted geographic zones, time ranges, and operational modes; generating a Merkle tree structure wherein each leaf node encodes a hash of a specific contextual parameter, computing a Merkle root which is cryptographically committed to a blockchain block by invoking a credential-anchoring smart contract, generating a Merkle proof associated with the issued credential and delivering said proof to the device node via an encrypted off-chain channel; and configuring the on-chain verification module to validate the credential by reconstructing the Merkle root from the submitted Merkle proof during the authentication request and comparing the reconstructed root with the committed Merkle root stored in the blockchain.

In one detailed embodiment, the credential issuance module is architected to leverage blockchain immutability and Merkle tree-based cryptographic proofs for the issuance and validation of fine-grained, contextual credentials. The process begins when a registered authority node—such as an administrator node or a trusted device provisioner—submits a credential issuance request to the module. This request includes the public key of the device to be credentialed and a set of contextual access parameters, which may include, but are not limited to, geographic zones in which the device is authorized to operate, specific time ranges for permitted activity, and operational modes such as read-only, write-enabled, or elevated privileges based on environment-specific logic.

Upon receiving this request, the module constructs a Merkle tree data structure to securely encode the contextual constraints. Each contextual parameter (e.g., "Zone=NorthAmerica", "TimeRange=08:00-18:00", "Mode=Maintenance") is first hashed using a secure hash function like SHA-256, and each resulting hash becomes a leaf node in the Merkle tree. The structure is recursively built by hashing pairs of leaf nodes until a single Merkle root is derived. This Merkle root serves as a compact cryptographic commitment to the entire set of contextual attributes without requiring full disclosure of the parameters themselves.

Once the Merkle root is computed, it is committed to the blockchain through a credential-anchoring smart contract. This smart contract accepts the Merkle root along with metadata such as the device identifier and credential issuance timestamp and stores it immutably on-chain within a credential registry. Concurrently, a Merkle proof is generated for the specific contextual parameters intended for the device. This Merkle proof comprises the necessary sibling hashes along the Merkle path required to reconstruct the Merkle root and validate the inclusion of a particular parameter set.

The generated Merkle proof is transmitted to the device node via an encrypted off-chain channel, such as TLS or a secure MQTT channel, ensuring confidentiality and minimizing on-chain data exposure. During future authentication requests, the device submits this Merkle proof alongside its credentials. The on-chain verification module—typically implemented as part of an authentication smart contract—then reconstructs the Merkle root using the submitted proof and compares it against the Merkle root previously anchored on the blockchain. If the roots match, it confirms that the device's contextual parameters have not been tampered with and that they align with the authorized credential scope.

For example, consider an industrial sensor deployed in a restricted facility in Tokyo. The credential issuance module receives a request to issue access for "Region=Tokyo", "TimeRange=06:00-22:00", and "Mode=Diagnostic". These parameters are hashed and formed into a Merkle tree. The root is written to the blockchain, while a Merkle proof containing sibling hashes for the above parameters is sent to the device. When the sensor attempts to authenticate at 07:00, it submits the Merkle proof. The blockchain smart contract verifies the proof by reconstructing the Merkle root and matching it with the on-chain root, thereby confirming the integrity and validity of the context. This cryptographic approach ensures selective disclosure, low data overhead, tamper resistance, and scalable proof verification, enabling decentralized yet policy-compliant access control in IoT and cyber-physical systems.

In an embodiment, the machine learning model comprises a federated recurrent neural network (RNN) with gated recurrent units (GRUs) deployed on each edge device node, wherein each node locally trains its GRU-based model on temporal sequences of authentication transactions comprising tuples of timestamp, success/failure status, user role, location hash, and device signal quality index, wherein the local model parameters are encrypted using a homomorphic encryption scheme prior to transmission, and wherein a smart contract on the blockchain coordinates secure model aggregation using a verifiable computation protocol, said protocol including:

(a) selecting aggregating nodes based on stake-weighted randomness;
(b) verifying zero-knowledge proofs attached to each encrypted model update;
(c) computing an aggregated model via homomorphic addition;
(d) updating the global model commitment stored on-chain with a new model hash committed by a smart contract that checks aggregation consistency using modular arithmetic integrity constraints, and wherein the anomaly detection output module is configured to compute anomaly scores in real-time using a temporal convolutional network (TCN), wherein input to the TCN includes fixed-length authentication event sequences extracted using a sliding window mechanism over blockchain transaction logs, wherein each sequence is normalized using z-score normalization applied to timestamp deltas, location entropy metrics, and user access frequency; wherein the TCN output layer produces a probabilistic anomaly score vector, and a softmax function is used to determine classification probabilities for "normal" and "anomalous" states, wherein anomaly thresholds are not fixed but learned via reinforcement learning policies which adjust threshold levels dynamically based on false-positive feedback received through a blockchain-based feedback channel linked to end-user device confirmations, and wherein alerts are generated only when the anomaly classification confidence exceeds an adaptive alerting threshold maintained in a smart contract-based configuration registry.

In one sophisticated embodiment, the system integrates a federated learning architecture built upon a recurrent neural network (RNN) framework with gated recurrent units (GRUs), deployed across distributed edge device nodes to facilitate decentralized, privacy-preserving behavioral modeling of authentication patterns. Each edge node, such as a smart IoT device or mobile terminal, locally trains its GRU-based model using time-series data that encapsulates sequences of authentication transactions. These transaction records are formatted as multi-dimensional tuples comprising elements such as timestamp, success or failure outcome of the authentication, user role designation (e.g., admin, guest), hashed location identifier, and signal quality index representing device connectivity status. The GRU architecture is particularly suited for capturing temporal dependencies and cyclical user behavior patterns, allowing the model to anticipate expected usage flows and detect deviations.

To ensure data privacy and eliminate the need to share raw user data, each node encrypts its trained model parameters using a homomorphic encryption scheme, such as the Paillier cryptosystem or BFV scheme, which permits arithmetic operations on ciphertexts without revealing underlying plaintext values. These encrypted parameter updates are transmitted to a blockchain-coordinated aggregation layer, governed by a smart contract designed to execute a verifiable computation protocol. This protocol includes several cryptographic and consensus-based subroutines: (a) aggregating nodes are selected dynamically using stake-weighted randomness, ensuring fairness while incentivizing participation by nodes with greater historical contributions or token stake; (b) each model update is accompanied by a zero-knowledge proof (ZKP), proving that the encrypted parameters were computed correctly based on local training, without revealing the data itself; (c) the smart contract then performs homomorphic addition on the encrypted updates, computing an aggregated global model without decrypting individual contributions; and (d) the final global model is hashed and written to the blockchain as a commitment. A smart contract verifies the structural and arithmetic integrity of the aggregated parameters using modular arithmetic constraints, ensuring tamper resistance and auditability.

To detect anomalous behavior in real-time, the system deploys a temporal convolutional network (TCN) in the anomaly detection output module. The TCN is fed with fixed-length sliding window sequences extracted from blockchain-authenticated transaction logs. These sequences are preprocessed using z-score normalization techniques that standardize features such as timestamp deltas (temporal gaps between authentications), location entropy (diversity of accessed locations), and user access frequency. The TCN, known for its ability to model temporal dependencies without the vanishing gradient issues of RNNs, produces a probabilistic anomaly score vector at its output layer. A softmax function is applied to this output to yield classification probabilities for “normal” and “anomalous” classes.

Importantly, anomaly thresholds are not statically configured but are adaptively tuned using reinforcement learning policies. These policies continuously adjust the decision boundary by incorporating feedback from device-level confirmations collected via a blockchain-based feedback mechanism. For instance, if a user confirms that a flagged anomaly was in fact a false positive, the threshold is increased marginally to reduce future false alarms. Conversely, confirmed true positives lower the threshold to increase sensitivity. This feedback loop enables the system to evolve in real-time to environmental changes and user-specific behavior. Alerts are generated only when the anomaly classification confidence—calculated from the softmax output—exceeds a dynamic alert threshold that is securely stored and version-controlled within a smart contract-based configuration registry. This configuration ensures both transparency and immutability of threshold management, supporting consistent audit trails and regulatory compliance.

As an illustrative example, imagine a wearable health monitoring device used in a hospital. It locally trains a GRU model using sequences of login attempts by medical personnel, along with metadata such as access time, signal strength, and shift role. Periodically, the encrypted model is sent with a ZKP to a blockchain-coordinated aggregation node, which updates the hospital-wide behavioral model. When an anomalous login is detected—say, an intern attempting access at an unusual hour from an unauthorized location—the TCN module flags the sequence as suspicious. If the user confirms it was unauthorized, the reinforcement learning mechanism lowers the anomaly threshold for similar future events. This embodiment seamlessly fuses federated learning, homomorphic encryption, blockchain smart contracts, and adaptive AI-based anomaly detection to deliver a zero-trust, privacy-preserving security architecture.

In an embodiment, the smart contract associated with the credential issuance module is configured to generate a time-constrained authorization credential by: initiating a credential creation subroutine upon receiving a validated registration transaction; hashing the device public key with a salt derived from a recent block timestamp and a device class identifier; encoding the resulting hash and an expiry block number into a signed credential payload using the ECDSA algorithm and the private key of a trusted authority node; writing the signed credential hash to a credential registry mapping in the blockchain state, indexed by the device ID, and returning a transaction event comprising the signed credential payload and credential metadata for off-chain retrieval and device-side caching, and wherein the credential issuance module is configured to generate access credentials through a blockchain-triggered issuance flow comprising: invoking a credential generation routine in response to a successful device registration event emitted by the smart contract; constructing a credential payload including device identity, permitted operational zones, temporal validity parameters, and a random challenge token generated by combining recent block metadata and a device-specific entropy value; applying a key-based signing operation to the payload using a private signing key stored within a hardware-trusted node of the network; storing the resulting signed credential in a distributed ledger field mapped to the device identifier, and emitting a blockchain event with the credential reference; and configuring the smart contract to reject future credential re-issuance attempts within a defined block window to prevent duplication or replay attempts.

In a further embodiment, the credential issuance module is designed to produce time-bound, cryptographically secure access credentials using a blockchain-integrated smart contract logic that incorporates both cryptographic hashing and signature verification for robust and tamper-resistant identity assertions. The process begins with the smart contract initiating a credential creation subroutine immediately upon detecting a validated device registration transaction. At this point, the smart contract computes a hashed identifier by concatenating the device's public key with a salt value dynamically derived from the latest blockchain block timestamp and a device class identifier (e.g., “sensor-type-A” or “medical-device-B”). This composite value is hashed using a cryptographic hash function such as SHA-3 to produce a unique, time-contextualized device fingerprint.

Subsequently, the credential generation subroutine encodes this hashed fingerprint along with an expiry parameter defined as a future block number (rather than an absolute timestamp, to ensure synchronization with blockchain consensus time). This payload is then signed using the Elliptic Curve Digital Signature Algorithm (ECDSA), wherein the private signing key resides in a secure enclave or Hardware Security Module (HSM) of a trusted authority node within the network consortium. The resulting signed credential is stored in a credential registry mapping structure embedded in the blockchain state, where each entry is indexed by the device ID for rapid lookup during future authentications.

To facilitate off-chain use and caching by the device, a blockchain transaction event is emitted that contains the signed credential and its associated metadata, such as issuance timestamp, expiry block, and access context. This event can be passively listened to by authorized network participants or retrieved directly by the device over a secure off-chain API for local storage and verification caching.

Additionally, the credential issuance module supports a blockchain-triggered credential flow that automatically responds to successful registration events. In this flow, the smart contract listens for an emitted “RegistrationSuccess” event and, upon capture, initiates the construction of a new credential payload. This payload includes the device's unique identifier, the authorized operational zones (e.g., GPS-defined geofences), temporal validity ranges (e.g., 09:00-18:00 UTC), and a challenge token generated from a fusion of recent block metadata (such as block hash and timestamp) and an entropy value unique to the device (e.g., derived from TPM hardware or a unique per-device initialization vector).

This assembled payload is then signed using a key-based signature mechanism with the private key securely stored on a hardware-trusted node—ensuring that the credential cannot be forged or replicated by non-authoritative sources. Once signed, the credential is stored in a distributed ledger field, such as a smart contract-based key-value store, with the key being the device ID and the value being the signed payload and access metadata. A blockchain event is broadcast referencing the credential, enabling decentralized systems and access control modules to verify and retrieve the credential in a tamper-proof, auditable manner.

To mitigate abuse through credential replay or duplication, the smart contract includes a logic guard that rejects any subsequent credential issuance attempt within a defined block interval (e.g., 20 blocks post-issuance). This rule is enforced by storing a temporal issuance log within the smart contract state and comparing incoming requests against it. If a re-issuance attempt is detected within the forbidden block window, it is automatically denied, and a failure event is emitted for auditing purposes.

For example, consider a drone that successfully completes registration with a blockchain-based airspace control system. The system generates a time-constrained credential that allows the drone to operate within "Zone-D" between blocks 8,000 and 12,000. The credential, signed using ECDSA with the private key of the national aviation authority node, is stored on-chain and returned to the drone. Later, when the drone attempts to re-request a credential due to a reboot or misconfiguration, the smart contract checks the block number of the original issuance and blocks the redundant request, preventing potential replay attacks or access duplication. This embodiment thus ensures secure, time-limited, non-replicable credential generation and distribution in a fully decentralized and cryptographically verifiable manner.

In an embodiment, the smart contracts implementing the access control logic are configured to dynamically interpret conditional access rules, comprising: receiving an authentication request embedded with timestamp, device ID, user role, and location metadata; retrieving access policy conditions associated with the device role from an on-chain rules registry, said conditions structured as a sequence of nested logical expressions; evaluating each expression using runtime metadata from the authentication request and on-chain parameters, wherein failure of any mandatory condition short-circuits the evaluation chain; executing additional conditional branches only when prior conditions marked as "pre-conditions" are satisfied, such that policy execution proceeds in a depth-first order of dependency; and returning an access grant token only when all applicable conditions within the execution path resolve as true, otherwise emitting a denial event with an encoded evaluation trace.

In one advanced embodiment, the access control mechanism is implemented using smart contracts that are capable of interpreting and executing complex, dynamic access policies based on conditional logic. These smart contracts act as policy interpreters on the blockchain, responding to incoming authentication requests that are structured to include a timestamp, the requesting device's identifier, the user's role (such as administrator, technician, or guest), and relevant location metadata. Upon receiving such a request, the smart contract queries an on-chain rules registry—a decentralized and immutable data structure that maps device types and user roles to access policy objects. These policy objects are encoded as structured logical expressions, often represented in nested form to reflect dependency hierarchies among conditions.

Each policy condition may pertain to time-of-day constraints, geographic access zones, user privilege levels, or device state attributes (e.g., firmware version, signal strength, prior alert flags). The smart contract evaluates these expressions in real-time using metadata from the authentication request, along with corresponding on-chain data such as registered user roles, device locations, or credential timestamps. The evaluation engine follows a depth-first logical execution model in which conditions marked as "pre-conditions" must be satisfied before additional dependent conditions are even considered. This structure ensures policy modularity and allows for concise rule chaining, minimizing computational complexity during rule resolution.

If any mandatory (non-optional) condition fails during evaluation, the smart contract employs a short-circuit mechanism, halting the policy traversal immediately and conserving gas or processing resources. This approach is critical in permissioned and resource-constrained blockchain environments. When all required conditions along the evaluation path resolve to true, the smart contract generates and returns an access grant token, typically encoded as a signed data structure that includes the device ID, permitted actions, and time-limited validity.

Conversely, if the evaluation results in failure due to one or more unmet conditions, the contract emits a denial event. This event contains an encoded evaluation trace—a machine-readable diagnostic path that indicates which condition failed and at what depth in the logic tree. This trace is useful for both automated auditing and debugging by administrators who need visibility into failed authentication attempts.

To illustrate this embodiment, consider an enterprise access management system controlling smart locks across different facility zones. Suppose a technician attempts to unlock a secure lab door using a smart badge device. The authentication request includes the badge ID, role as "technician," a timestamp, and the badge's geolocation. The smart contract retrieves the corresponding access policy, which may state: "If user role=technician AND current time is between 08:00 and 18:00 AND location=authorized lab zone AND firmware is up-to-date, THEN allow access." If the badge firmware is outdated, the smart contract short-circuits the evaluation and emits a denial event, flagging the firmware check as the failure point. If all conditions pass, the contract returns a signed token granting access, valid only within a specified temporal window and action scope.

Through this embodiment, the system delivers a secure, flexible, and auditable access control framework, where policy evaluation is decentralized, logic-driven, and fully traceable, while supporting sophisticated condition sets and real-time metadata interpretation.

In an embodiment, the authentication server is configured to validate incoming authentication requests by executing a multi-phase validation process, comprising: validating the freshness of the request timestamp by comparing it against the current time offset derived from blockchain block timestamps, checking the uniqueness of the attached metadata token against a nonce history table stored off-chain and synchronized with the smart contract state to prevent replay, retrieving the device's public key from the blockchain using its identifier and verifying that the submitted metadata matches the registered key context, computing a verification output by comparing a derived hash of the submitted authentication payload with a hash derived from the decrypted signature using the registered key, and only marking the request as authenticated when all prior comparisons succeed and the metadata token has not been previously used within the current authentication cycle.

In one comprehensive embodiment, the authentication server is designed to perform a rigorous multi-phase validation process to ensure that every authentication request is legitimate, timely, and free from replay or forgery attempts. When an authentication request is received, the server initiates the first phase by validating the temporal freshness of the request. Instead of relying on potentially manipulable system clocks, the server references the latest blockchain block timestamps to derive a decentralized, tamper-proof notion of the current time. The timestamp embedded within the authentication request is then compared against this blockchain-derived current time, factoring in a permissible drift window to account for propagation delays. If the request falls outside this window-either as a delayed replay or a future-dated spoof—it is rejected immediately to maintain temporal integrity.

In the second phase, the server examines the uniqueness of the request by validating the metadata token associated with the authentication event. This token typically contains nonce-like elements or session-specific entropy. To detect and prevent replay attacks, the server maintains a nonce history table stored off-chain for performance efficiency but synchronized with the on-chain smart contract state. Each incoming token is cross-checked against this table to ensure it has not been previously used during the current authentication cycle. If a match is found, the request is flagged and denied as a replay attempt.

The third phase of validation involves the verification of the cryptographic identity of the requesting device. Using the device identifier provided in the request, the server queries the blockchain to retrieve the associated public key, which was registered immutably during the device enrollment phase. This key is part of the trusted state stored on-chain and acts as a binding reference for all future cryptographic operations. The server then verifies that the metadata attached to the request—such as the device class, firmware version hash, or authorized role—matches what is registered on-chain for that public key, ensuring that the request originates from a valid and non-compromised device configuration.

Following metadata validation, the server proceeds to the signature verification step. It computes a hash of the submitted authentication payload using a secure hash function such as SHA-3. Simultaneously, it decrypts the digital signature included in the request using the retrieved public key. A second hash is then derived from this decrypted signature. The two hashes—one from the submitted payload and one from the decrypted signature—must match exactly. If they do, it confirms that the request was signed using the private key corresponding to the registered public key, thereby ensuring authenticity and non-repudiation.

Only when all previous validations succeed—freshness, uniqueness, metadata alignment, and cryptographic proof—is the request marked as authenticated. Additionally, the metadata token used in the request is immediately recorded in the nonce history table and tagged as consumed, ensuring that it cannot be reused for future attempts within the same authentication cycle. This closed-loop system guarantees robust, multi-layered authentication while utilizing blockchain for immutable state verification, off-chain optimization for performance, and strong cryptographic assurance to prevent spoofing, tampering, or replay attacks.

As an example, consider a biometric terminal in a secure facility submitting an authentication request. The server checks that the timestamp is within 30 seconds of the current Ethereum block time, confirms that the token hasn't been used before, retrieves the terminal's public key from the blockchain, and verifies the signature using the request payload. Upon success, access is granted, and the token is burned for future replay prevention. This multi-phase process ensures trust, integrity, and resistance against adversarial threats in decentralized and high-security environments.

In an embodiment, the machine learning model is trained using decentralized data across a plurality of nodes without central aggregation of raw data, comprising: initiating local training sessions on participating nodes using device-specific authentication event logs, each event log structured as time-series sequences of access attempts including metadata tuples; generating updated local model parameters based on the event logs without transmitting those logs outside the device boundary, encrypting the parameter updates using a shared secret derived from a blockchain-validated session key agreement, submitting the encrypted model updates to a coordination smart contract which aggregates contributions and verifies structural integrity of each update via a consistency check procedure, and producing a global update token committed on-chain that includes a reference to the aggregated result and a list of contributing device node identifiers.

In one decentralized and privacy-preserving embodiment, the system employs a federated machine learning approach to train a predictive authentication model using data distributed across multiple nodes without requiring central aggregation of raw data. Each participating node, typically representing an edge device such as a smart terminal, sensor, or access point, maintains its own log of authentication events. These logs are structured as time-series sequences where each entry is a metadata tuple consisting of attributes such as timestamp, access status (success or failure), user role, device signal strength, geolocation hash, and environmental context variables. By keeping the raw data localized to the device, the system inherently preserves user privacy and reduces exposure risks.

Training is initiated locally on each node using this device-specific data. Each node executes an instance of the machine learning model, which may be a recurrent neural network (RNN), gated recurrent unit (GRU), or transformer-based architecture suitable for temporal analysis. The model processes the time-series authentication data to identify behavioral patterns and anomalies unique to the device's operational environment. Instead of sharing the raw logs, each node computes model updates—such as weight gradients or parameter shifts—based solely on its local training data.

To ensure secure communication and prevent adversarial model poisoning, these updates are encrypted using a shared secret derived from a blockchain-validated session key agreement protocol. The shared key may be negotiated through a Diffie-Hellman-like handshake whose session parameters and cryptographic keys are logged on-chain for traceability and verification. This key is used to symmetrically encrypt the model update payload using algorithms like AES-GCM or ChaCha20-Polyl305, ensuring confidentiality and integrity in transit.

Once encrypted, the model updates are submitted to a coordination smart contract deployed on the blockchain. This contract acts as a decentralized orchestrator, collecting the encrypted model contributions from multiple nodes. It also performs a consistency check to verify structural integrity of each submission, such as ensuring the update tensor dimensions match the expected model architecture and that no malformed or duplicated submissions exist. These checks are critical to prevent model corruption or malicious injections.

After validating all received updates, the smart contract aggregates the contributions—typically through secure aggregation protocols such as federated averaging or homomorphic addition, depending on the underlying encryption technique. Upon successful aggregation, the smart contract generates a global update token, which includes a cryptographic hash or Merkle root of the aggregated model, and commits it to the blockchain ledger. This token serves as a verifiable reference to the new global model and includes metadata such as the block number of update commitment and a list of device node identifiers that contributed to the current training cycle. This on-chain commitment not only provides immutability and traceability but also allows devices or administrators to independently verify participation and integrity of the update process.

For example, in a hospital network with dozens of biometric scanners, each scanner locally trains a GRU-based model to learn user login sequences during different shifts. After training, the scanner encrypts its model update with a key derived from a blockchain-approved session and submits it to the coordination smart contract. The contract checks each update's validity, aggregates them, and writes a global model hash to the chain with the contributing scanner IDs. This allows the system to maintain high accuracy across the network without ever exposing sensitive authentication logs or patient data, thus achieving secure, scalable, and trustworthy federated learning.

In an embodiment, the anomaly detection output module is configured to continuously monitor authentication activity and flag patterns deviating from learned sequences, comprising: capturing sequential access metadata windows across fixed time intervals, each window representing a vector of values including access frequency, time-of-day, device health status, and success ratio; comparing incoming metadata windows to baseline behavioral profiles pre-learned from historical data, using a similarity scoring function computed locally at the edge; assigning an anomaly likelihood score to each sequence window based on divergence from expected value ranges and sequence order; and generating a system alert if the anomaly score exceeds a dynamically adjusted threshold, said threshold calibrated during operation based on feedback derived from confirmed true-positive and false-positive cases linked to downstream access events.

In one continuous and intelligent monitoring embodiment, the anomaly detection output module is architected to operate in real-time, persistently analyzing authentication activity streams to identify patterns that deviate from established behavioral norms. The module functions by capturing sequential access metadata organized into fixed-length time windows—each window encapsulating a structured vector of features. These features may include the frequency of authentication attempts within the interval, the distribution of those attempts across different times of day, real-time device health metrics (such as CPU load or battery level), and the success ratio of authentication events (i.e., the proportion of successful versus failed attempts).

These windows are generated at the edge, directly on the device or local node, to support decentralized intelligence and low-latency processing. Each incoming metadata window is compared against a baseline behavioral profile that has been previously learned from the device's own historical data or from federated model updates. This baseline encapsulates expected sequences and acceptable statistical variations in user or device behavior under normal operating conditions. The comparison utilizes a locally computed similarity scoring function, which may be implemented as a combination of Euclidean distance for numerical vectors and sequence similarity measures like Dynamic Time Warping (DTW) or cosine similarity for time-dependent patterns.

Each comparison yields an anomaly likelihood score, which quantifies the degree of divergence between the observed window and the baseline profile. This score is calculated not only from the absolute deviations in feature values but also from the order and structure of the sequence—ensuring that even subtle but temporally unusual patterns (such as authentication attempts occurring at unusual hours or in bursts) are captured. For example, an unusually high access frequency during a low-activity hour with decreasing success rates and degraded device health might produce a high anomaly score, signaling potential misuse or compromise.

The system does not rely on static thresholds for flagging anomalies. Instead, it uses a dynamic thresholding mechanism that is continuously adjusted based on real-time operational feedback. This feedback is derived from the system's downstream validation pipeline, which classifies historical anomaly alerts into confirmed true positives (e.g., actual breach attempts) and false positives (e.g., legitimate but unusual behavior). By analyzing the outcomes of prior alerts, the system tunes its threshold to balance sensitivity and specificity, reducing alert fatigue while maintaining strong security posture. For instance, if a particular pattern frequently triggers false alarms, the threshold may be incrementally raised; conversely, in the case of repeated undetected anomalies, it may be lowered.

When an anomaly score for a new sequence window exceeds the current adaptive threshold, the system immediately generates a system alert. This alert may include a descriptive payload detailing the detected deviation, timestamp, and associated risk metrics, and may be logged on-chain for auditability or transmitted to administrators via secure off-chain notification channels.

As a practical illustration, consider a secure facility where employee access patterns are typically consistent—staff log in between 8 AM and 6 PM, with minimal night-time activity. If an edge device suddenly detects a spike in login attempts at 3 AM, with a deteriorating device health indicator and a drop in success ratio, the anomaly detection module scores the window as highly anomalous. If the score surpasses the feedback-tuned threshold, the system emits an alert, prompting a lockdown or secondary authentication requirement. This embodiment supports real-time, context-aware threat detection while learning and adapting dynamically to evolving operational environments.

In an embodiment, the authentication server further comprises a state transition controller configured to enforce sequential state evaluation of authentication outcomes, comprising: maintaining a local authentication session table for each device identifier containing state flags for signature verification, metadata validation, nonce uniqueness, and credential expiry status; initializing all state flags to an indeterminate state upon receipt of an authentication request; setting the signature verification flag only if a signature digest computed from the request matches a digest reconstructed using the public key stored on-chain; setting the metadata validation flag only if the device's identifier, timestamp, and context parameters align with those registered in the blockchain's access mapping structure; and only transmitting an approval response to the requesting node if all flags are marked valid within a single authentication cycle and the session table reflects no pending invalidation events.

In one structured and deterministic embodiment, the authentication server incorporates a state transition controller to rigorously manage the evaluation of authentication requests through a well-defined sequence of logical validation states. The purpose of this controller is to ensure that all components of an authentication request are verified not only independently, but also in the correct order, with interdependent logic maintained across a unified session lifecycle. For every incoming request, the controller creates or references a local authentication session table indexed by the requesting device's unique identifier. This table includes a set of state flags—each representing a specific validation phase—namely: signature verification, metadata validation, nonce uniqueness, and credential expiry status.

When a new authentication request is received, all flags within the session table are initialized to an indeterminate state, denoting that no assumptions are yet made about the validity of any authentication component. The first phase in the state machine is signature verification. Here, the system computes a digest (e.g., using SHA-3) from the submitted authentication payload and compares it against a digest reconstructed from the decrypted signature attached to the request. This decryption is performed using the public key associated with the device, which is retrieved in real time from the on-chain device registry. Only if these digests match does the signature verification flag transition to a valid state, ensuring the authenticity of the request and its origin.

Once the signature verification flag is valid, the controller proceeds to the metadata validation phase. The metadata included in the request—such as the device's unique ID, the timestamp, access role, and potentially contextual fields like location or firmware hash—is compared against entries in the blockchain's access mapping structure. This structure is a tamper-proof ledger that stores the registered device profiles and permitted operational parameters. If all metadata fields in the request match those on-chain, the metadata validation flag is set to valid.

Next, the controller evaluates the uniqueness of the nonce or token included in the request. This is critical for preventing replay attacks. The nonce value is checked against a synchronized off-chain nonce history table, which is tied to blockchain event triggers or smart contract emissions that record past authentication cycles. If the nonce has not been previously used in the current cycle, the nonce uniqueness flag is set to valid.

The final check concerns the credential expiry status. The authentication server retrieves the credential metadata associated with the device from the blockchain and confirms that the current block timestamp falls within the permitted credential validity window. If the credential is still active, the expiry status flag is set to valid.

Only when all four state flags—signature verification, metadata validation, nonce uniqueness, and credential expiry—are concurrently marked as valid within the same authentication cycle, and the session table contains no invalidation events (such as timeout triggers, revocation events, or parallel conflict entries), does the state transition controller permit the transmission of an approval response. This response may take the form of an access grant token, a blockchain-anchored confirmation event, or a secure API-level handshake acknowledgment.

As an example, consider a wearable security badge submitting a request to unlock a door. The server initializes state flags, verifies the signature using the public key from the blockchain, confirms the metadata aligns with the badge's registered role and permitted door access, checks the nonce has not been reused, and ensures the badge credential is still valid. Only when all four validations pass in the correct order and the session table reflects a clean state, the door access is approved. This embodiment ensures strict sequencing, non-repudiation, and tamper-resilient access control in zero-trust authentication environments.

In an embodiment, each device node is further configured to initiate a secure compromise broadcast sequence upon detection of a local anomaly or breach, comprising: detecting tamper or compromise conditions based on predefined thresholds for unusual authentication attempts, invalid credential requests, or erratic metadata fluctuations; constructing a broadcast payload that includes a timestamp, device identifier, event code, and a cryptographically signed emergency revocation request; transmitting the payload to at least three neighboring nodes within the consortium network, and upon receipt of at least two confirmations from peer nodes, triggering an on-chain smart contract that updates the revocation list mapping and temporarily disables all credentials associated with the device's identifier for a preconfigured quarantine period.

In one resilient and decentralized security embodiment, each device node is autonomously empowered to detect and respond to signs of compromise through a secure compromise broadcast sequence. This mechanism is critical in environments where centralized detection may be too slow or unreliable, and fast, peer-confirmed action is needed to contain threats. Each device continuously monitors its own operational context for tamper or breach indicators using a locally embedded anomaly detection engine. This engine evaluates authentication-related activity in real time and compares it against a set of predefined thresholds that define acceptable behavior ranges. These thresholds may include metrics such as an unusually high number of failed authentication attempts within a short time frame, attempts to use revoked or unrecognized credentials, erratic or abrupt changes in contextual metadata (like location shifts or firmware anomalies), or detected hardware tampering from embedded sensors.

When the local anomaly detection logic crosses a critical threshold—indicating a high likelihood of compromise—the device immediately initiates a secure broadcast sequence to alert other nodes within the consortium network. The device constructs a broadcast payload that includes the current timestamp, the unique device identifier, a specific event code classifying the nature of the compromise (e.g., tamper_detected, firmware_mismatch, nonce_reuse_alert), and most importantly, a cryptographically signed emergency revocation request. This signature is produced using the device's private key, ensuring the authenticity and integrity of the broadcast and preventing spoofing by malicious actors.

This payload is transmitted to at least three neighboring nodes in the consortium network using a secure communication protocol, such as TLS over a mesh network or a blockchain-side communication channel. Each recipient node independently verifies the digital signature and performs a lightweight validation of the payload's content. If at least two of the three nodes confirm the legitimacy of the broadcast—serving as decentralized witnesses to the compromise—the revocation sequence is escalated.

Upon reaching this quorum, a smart contract deployed on the blockchain is invoked with the broadcast payload and peer confirmations. This contract updates the on-chain revocation list mapping to include the compromised device's identifier. The revocation mapping is a secure registry that flags devices as untrusted and prevents their credentials from being used in future authentication attempts. Simultaneously, the contract enforces a quarantine policy, temporarily disabling all credentials associated with the device for a predefined period (e.g., 24 hours or 100 blocks), during which administrative review or forensic investigation can be conducted. This time-bound lockdown ensures containment without requiring permanent revocation unless further validated.

For instance, if a smart sensor at a chemical plant detects a sequence of 20 failed access attempts using unknown credentials within a one-minute window, and detects erratic signal strength suggesting physical interference, it constructs a compromise alert. It signs the alert and broadcasts it to three other sensors in the same facility. Two sensors verify and acknowledge the alert, triggering the smart contract. The system then adds the sensor to the revocation list and prevents it from participating in the control network until the quarantine window expires or manual override occurs.

This embodiment thus provides a decentralized, verifiable, and prompt response to potential security threats, leveraging peer consensus, on-chain auditability, and cryptographic trust to protect the network from the spread of compromise while maintaining system resilience.

In an embodiment, the smart contract responsible for managing active credentials is further configured to enforce credential invalidation via consensus-triggered revocation, comprising: receiving revocation requests submitted by authorized consortium members, each request containing a justification code and a reference to the target device credential; recording each request in an on-chain revocation proposal log and assigning a unique revocation ID; initiating a timed voting phase wherein each registered member node submits a vote for or against revocation, tied to the revocation ID and authenticated via its node credentials; tallying votes after expiration of the voting phase duration and revoking the credential only if the number of affirmative votes exceeds a predefined approval threshold; and updating the revocation registry on-chain to reflect the revocation status and enforce denial of all future authentication attempts using the revoked credential.

In one robust and democratically governed embodiment, the smart contract tasked with managing active device credentials is extended to include a consensus-driven revocation protocol, ensuring that credential invalidation occurs in a transparent, auditable, and multi-stakeholder fashion. This mechanism is particularly vital in consortium-based blockchain systems where trust is distributed among multiple participating entities, such as government agencies, enterprise divisions, or federated service providers.

The revocation process begins with the submission of a revocation request by an authorized consortium member. Each member node has a unique identity and cryptographic credential registered on-chain, which it uses to authenticate such actions. The revocation request includes a reference to the target device credential (typically the device ID or credential hash) and a justification code that denotes the reason for revocation. Justification codes may represent reasons such as key compromise, abnormal behavioral patterns, operational decommissioning, or detected non-compliance with security policy.

Once submitted, the smart contract logs the request in an immutable on-chain revocation proposal ledger, where each entry is indexed by a uniquely generated revocation ID. This ID serves as a reference anchor for tracking the proposal across its lifecycle. Immediately upon logging, the contract initiates a timed voting phase. During this window—defined by a specific number of blocks or a fixed wall-clock duration—each registered consortium member is permitted to cast a vote in favor of or against the proposed revocation. Votes are tied to the revocation ID and are authenticated using each member's node credentials through digital signatures, ensuring that voting cannot be spoofed or duplicated.

Votes are tallied automatically by the smart contract once the voting phase expires. A revocation is only enacted if the number of affirmative (yes) votes exceeds a predefined approval threshold, which may be expressed as a simple majority, supermajority (e.g., two-thirds), or configurable policy rule. This threshold can be dynamically adjusted via governance parameters stored in the contract or determined by the consortium's operational charter. If the threshold is met, the smart contract updates the revocation registry on-chain to reflect the new status of the credential as revoked.

The revocation registry is a secure, indexed data structure that maintains a list of invalidated credentials. It is referenced by all participating authentication and access control modules during validation checks. Once a credential is marked as revoked, any future authentication attempt using that credential is automatically denied by the system, regardless of whether the credential's original validity period has expired. This ensures immediate and enforced exclusion of the compromised or decommissioned device from the network.

To illustrate, consider a multinational supply chain network in which a logistics tracking device is suspected of being hijacked or cloned. An authorized security node from one region files a revocation request, citing a "geo-fence breach" justification code. The proposal is logged, and all other member organizations—such as customs authorities, shipping partners, and warehouse nodes—are prompted to vote. After 24 hours, 75% of nodes have voted in favor, exceeding the required 66% supermajority. The smart contract executes the revocation, updates the registry, and ensures that the device's credentials are now unusable across all authentication points. This embodiment guarantees collective oversight, auditability, and immediate enforceability of revocation decisions in decentralized multi-entity infrastructures.

In an embodiment, the access control logic implemented by the smart contract is further configured to enforce multi-tier access levels across device types and user roles, comprising: retrieving the current user role and device class associated with the authentication request; mapping the role and device class to a tiered access level by referencing an access tier matrix stored on-chain, wherein each cell of the matrix defines permitted operations for a given role-device pair; validating the requested operation within the access request against the mapped tier definition; and permitting or rejecting the operation based on whether the operation is included within the authorized action set defined for the current tier, and further storing the result of the access attempt in a tiered access log table used for generating aggregate access heatmaps for policy optimization, and wherein the access control logic evaluates temporal access constraints using a real-time blockchain time oracle, comprising: querying a decentralized time service embedded in the blockchain consensus layer to obtain a network-synchronized current block timestamp; comparing the timestamp embedded in the authentication request against both the minimum and maximum allowed time ranges defined in the access policy object; applying a grace period delta to compensate for block propagation delays, and allowing the authentication to proceed only if the timestamp of the request falls within the extended window, wherein policy violations outside the window are logged with a temporal error code for audit tracing.

In one embodiment, the access control logic governed by the smart contract is designed to enforce fine-grained, multi-tier access control by dynamically evaluating user roles and device types against a pre-defined hierarchical access structure stored on-chain. When an authentication request is received, the smart contract extracts the associated user role (e.g., technician, administrator, guest) and the device class (e.g., surveillance camera, medical scanner, industrial actuator) from the request metadata. It then queries an access tier matrix—a decentralized lookup table maintained immutably on the blockchain—that maps each unique combination of user role and device class to a specific access tier. Each cell in this matrix defines a permissible set of operations for that role-device pairing, such as "read-only," "diagnostic," "full control," or "restricted access."

The smart contract validates the operation requested in the current authentication event—such as firmware update, data retrieval, or command issuance—by checking whether it is included in the set of authorized actions for the user-device tier. If the requested action aligns with the allowed set for the given tier, the request is approved; otherwise, it is rejected. This tier-based enforcement supports hierarchical permission structures and minimizes the risk of privilege escalation, especially in sensitive or critical environments.

Beyond binary approval or rejection, the result of each access request is recorded in a tiered access log table—an on-chain structure or event log that captures details such as device ID, user role, access tier, requested operation, outcome, and timestamp. These logs are used to generate aggregate access heatmaps and usage analytics, providing administrators with empirical data to refine access policies, detect over-privileging, and optimize system configurations. These logs also serve as an immutable audit trail, supporting forensic investigations and regulatory compliance.

To further ensure contextual integrity, the smart contract also evaluates temporal access constraints using a real-time blockchain time oracle. This oracle is integrated within the consensus layer of the blockchain protocol and provides a decentralized, tamper-proof source of the current block timestamp. The access control logic compares the timestamp embedded in the authentication request against the allowed access window defined in the device's access policy object. This window typically specifies a start and end time during which access is permitted, such as "Monday to Friday, 08:00 to 18:00 UTC."

To account for network latency and block propagation variability, a grace period delta (e.g., ±5 seconds or ±1 block) is applied to the time window. This adjustment ensures fairness and prevents legitimate requests from being denied due to minor synchronization discrepancies. If the timestamp falls within the extended window, the request proceeds; otherwise, the smart contract denies the request and logs the event along with a temporal error code that denotes the specific reason for failure—such as "expired window" or "premature attempt." These error codes are also written to the audit log, enabling precise traceability of access violations.

For instance, consider a technician with diagnostic-level access attempting to run a system health check on a robotic arm that belongs to a restricted device class. The smart contract confirms that the technician role and robotic device map to Tier-2 access, which includes diagnostics but excludes firmware updates. It then checks that the request timestamp aligns with the permitted hours. Since both conditions are met, the operation is allowed, and the access event is logged with Tier-2 classification. If the same technician attempted the update outside the allowed time window or tried to perform a disallowed operation (e.g., emergency override), the smart contract would reject the request, flag it with a temporal or tier-violation code, and record the attempt in the audit trail.

This embodiment ensures dynamic, context-aware, and policy-compliant access control, while leveraging the immutability and transparency of blockchain to support verifiability, operational control, and policy evolution over time.

In an embodiment, the authentication server and on-chain verification module are cooperatively configured to execute a multi-phase adaptive authentication delay protocol in response to detected abnormal behavioral signatures, comprising: receiving, at the anomaly detection output module, a classification score associated with a current authentication request, said score derived from sequential deviation patterns of recent access attempts linked to the same device or user identity; evaluating the score against a dynamic suspicion threshold maintained in a time-weighted suspicion scoring model that incorporates historical confidence values and system-wide anomaly frequency metrics; initiating a delay trigger if the score exceeds the suspicion threshold but does not surpass a critical anomaly cutoff level, said trigger comprising a wait instruction issued to the requesting device via the authentication request module, calculating the wait duration based on a compounded function of the deviation magnitude, system congestion level, and current time proximity to previously denied requests; recording the delayed authentication event in a temporary buffer ledger synchronized with the blockchain network, and re-invoking the on-chain verification logic upon expiry of the wait duration to resume authentication flow, wherein successful post-delay authentication results are weighted to lower future suspicion scores, and failed authentications are escalated to a revocation review module for further action.

In one intelligent and security-sensitive embodiment, the authentication server and the on-chain verification module are jointly configured to implement a multi-phase adaptive authentication delay protocol that dynamically modulates authentication processing in response to behavioral anomalies. This approach allows the system to balance responsiveness with caution, particularly when dealing with borderline suspicious activities that may not warrant immediate rejection but still raise security concerns. The process begins when an authentication request is received and evaluated by the anomaly detection output module, which assigns a classification score to the request. This score is computed by analyzing sequential deviation patterns in recent access attempts associated with the same user or device identity, using a learned model that considers changes in parameters such as access time irregularities, location shifts, user roles, and behavioral entropy over time.

The assigned classification score is then compared against a dynamic suspicion threshold, which is maintained in a time-weighted suspicion scoring model. This model continuously evolves by integrating historical authentication confidence values, system-wide anomaly frequency, and the recency of past security incidents. It ensures that the system remains sensitive to context, such as increasing strictness during periods of high threat activity and relaxing during low-risk periods. If the current score exceeds the suspicion threshold but remains below a higher, critical anomaly cutoff level, the system does not immediately deny the request. Instead, it activates a delay trigger, signaling the need for cautious deferment.

This delay trigger is implemented by issuing a wait instruction to the requesting device via the authentication request module. The wait duration is not arbitrary—it is calculated based on a compounded function that incorporates the magnitude of deviation in the classification score, current system congestion levels (such as pending requests or processing loads), and the temporal proximity of the current request to previously denied or suspicious authentication attempts. This adaptive delay introduces friction for potentially compromised devices or actors without prematurely rejecting valid users who may be exhibiting rare but legitimate behavior.

During the enforced delay, the authentication request is held in a temporary buffer ledger, which is synchronized with the blockchain to ensure transparency, consistency, and auditability. This buffer maintains state information such as the request metadata, calculated delay period, and the pending verification outcome. Once the delay interval expires, the authentication flow resumes, and the on-chain verification logic is re-invoked. This logic re-evaluates the authentication request using the original parameters and determines whether it now qualifies for approval.

If the post-delay authentication is successful—meaning the request passes signature verification, metadata consistency, and credential validity checks—the system adjusts future suspicion scores downward for the device or user identity, recognizing the event as a likely false positive. This feedback loop helps reduce future delays for the same entity under similar behavioral patterns, thereby improving user experience without compromising security. On the other hand, if the delayed authentication still fails or exhibits further anomalies, the request is escalated to a revocation review module, which may initiate device quarantine, trigger a compromise broadcast, or invoke consensus-based credential invalidation.

As a practical example, consider an administrator logging in from an unusual time zone due to unexpected travel. The anomaly detection module flags the behavior as moderately suspicious based on deviation from recent access patterns. Instead of denying access outright, the system issues a delay of 45 seconds while recording the request in a synchronized buffer. After the delay, the system completes verification, finds the credentials and context valid, and permits access. The outcome is logged, and future similar events from the same user will trigger shorter delays or bypass them entirely, assuming consistent verification. This embodiment introduces a nuanced, self-adjusting security layer that responds intelligently to uncertainty, offering resilience, transparency, and adaptability in high-assurance authentication environments.

Figure 2:
FIG. 2 illustrates a flow chart of a blockchain-based authentication method for a smart city environment in accordance with an embodiment of the present disclosure.

FIG. 2 illustrates a flow chart of a blockchain-based authentication method for a smart city environment in accordance with an embodiment of the present disclosure.

Referring to FIG. 2, the blockchain-based authentication method (200) comprises a plurality of steps as described under:

At step (202), the method (200) includes storing records of authorized device identities on a consortium blockchain network managed by a plurality of registered users.

At step (204), the method (200) includes registering a device on a blockchain network, creating a unique device identity, and generating a corresponding public-private key pair.

At step (206), the method (200) includes issuing credentials, using a plurality of smart contracts coupled to the blockchain network, that link the device's public key to its registered identity, and storing the credentials on a cloud server.

At step (208), the method (200) includes operating a plurality of device nodes, each device node comprising a vehicle or a drone, as nodes within the consortium blockchain network.

At step (210), the method (200) includes securing key storage and blockchain interaction at each device node using an onboard module.

At step (212), the method (200) includes performing off-chain interactions, including data analytics, using an optional authentication server, wherein the off-chain interactions do not undermine decentralized authentication logic implemented by the consortium blockchain network and smart contracts.

At step (214), the method (200) includes generating an authentication request at the device by signing the request using the device's private key and attaching metadata using an authentication request module.

At step (216), the method (200) includes granting or denying access based on a generated authentication result by using an on-chain verification module, wherein said authentication result is generated upon verifying the authentication request on-chain by validating a digital signature of the authentication request against the public key recorded on the blockchain network by network nodes.

At step (218), the method (200) includes logging the authentication attempt on the blockchain network.

At step (220), the method (200) includes immutably recording authentication attempts on the blockchain network and providing the registered user access to review logs for anomaly detection and auditing.

At step (222), the method (200) includes managing device credentials, monitoring system status within the consortium blockchain network, and interacting with the authentication system via a user interface by the registered user.

In an embodiment, the identity registration comprises: generating a unique cryptographic identity for each electric vehicle and drone; storing the identity on the blockchain ledger using the smart contract; and issuing a blockchain-based credential to the registered device. In an embodiment, the authentication process includes: receiving an authentication request from the electric vehicle or drone; validating the request through smart contract execution; and granting or denying access based on a set of predefined authentication policies, wherein said policies are selected from a group of a user with registered EVs/drones with valid digital certificates or unique identifiers, the user of the EV/drone must provide valid credentials linked to their registered identity, different roles have varying levels of access to system resources and functionalities, access is granted or denied based on the time of day or day of the week and based on the EV/drone's location, access is influenced by the device's or user's past transaction history and reputation score, and access may be restricted based on the health and status of the EV/drone.

In an embodiment, the method (200) further comprises detecting unauthorized access attempts through anomaly detection mechanisms embedded in the blockchain; and notifying administrators via the user interface when a security breach is detected; managing a distributed ledger to record device data and access control information; operating an off-chain backend module communicatively coupled to the granted blockchain platform, the off-chain backend module: implementing business logic for device management and monitoring, and providing the user interface for device management and monitoring;

In an embodiment, the method (200) further comprises detecting suspicious authentication patterns in blockchain data using at least one machine learning model, comprising: accessing and receiving authentication data from the blockchain via a blockchain data interface; analyzing the authentication data using the at least one machine learning model to establish a baseline of normal authentication patterns; detecting deviations from the baseline using the at least one machine learning model, wherein the deviations are indicative of anomalous authentication patterns; and generating an alert in real-time upon detection of anomalous authentication patterns; automatically triggering a security action in response to the generated alert; and detecting deviations in real-time is performed by continuously or periodically analyzing incoming authentication data against the established baseline.

The present disclosure relates to a blockchain-based authentication system comprising a decentralized architecture ensuring security, privacy, and scalability demands of electric vehicles and drones in smart city environment. The proposed system with blockchain architecture and smart contract automation, addressed the critical challenges such as single point of failure, impersonation, and privacy leakage in already existing centralized authentication systems. The proposed system is configured to provide robust performance under varying loads, and mitigate cyberattacks such as spoofing and replay attacks.

Figure 3:
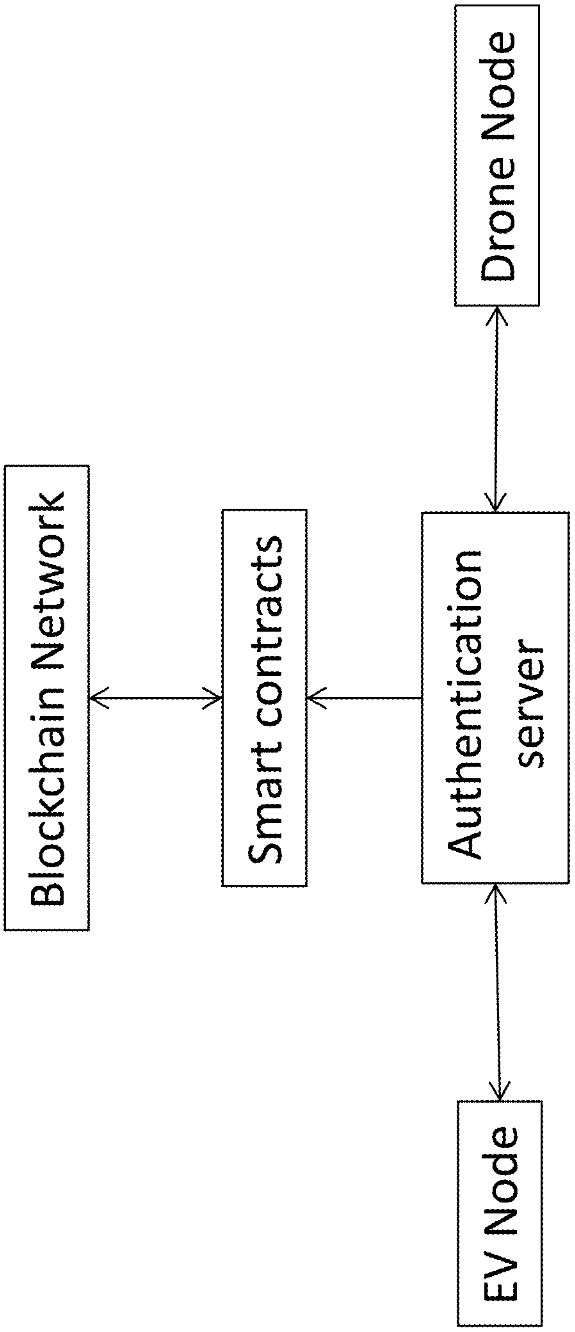
FIG. 3 illustrates a block diagram showing high-level architecture of the proposed authentication system in accordance with an embodiment of the present disclosure.

FIG. 3 illustrates a block diagram showing high-level architecture of the proposed authentication system in accordance with an embodiment of the present disclosure.

Referring to FIG. 3, the proposed blockchain-based authentication system comprises multiple components configured to operate seamlessly in a smart city environment. The system includes a Blockchain network, wherein a consortium of blockchain is managed by the city authorities, including EV manufacturer, drone service providers, and other stakeholders. The system further include smart contracts, which are self-executing coder that resides within the blockchain, configured for implementing identity registration, credential issuance, and access control logic. The system further includes an authentication server, which is an option server that is configured to handle off-chain interactions such as data analytic or integration with legacy systems. The system further includes device nodes which are EVs and drones equipped with onboard modules for secure key storage and interaction with blockchain network. Lastly, the system includes an user interface, which is mobile or web application configured to be operated by the user, owners, or administrators, for managing device credentials, and monitor system status.

Referring to FIG. 3, each device, whether it is EV or done, is configured to function as a node in the blockchain network. The system includes a blockchain ledger that contains records of authorized device identities, updated via smart contracts. The optional authentication server can handle legacy system integration or data analytics tasks without undermining the decentralized authentication logic.

In an embodiment, the operation of the proposed system includes multi-steps, wherein the operation ensures secure and tamper-proof device authentication. The multi-step workflow of the system includes a step for identity registration, wherein the device manufacturer or city authority registers a new EV or done device on the blockchain network, using smart contract. Herein, a unique device identity is created, and a corresponding public-private key pair is securely generated. The workflow further includes a step of credential issuance, wherein smart contract issue credentials, stored on the secure hardware module of the device, wherein said credentials link the public key of the device to its registered identity. The workflow further includes a step of authentication request, wherein during attempting an operation of the device, the device signs a request using its private key, attaching necessary metadata, such as time stamps, device ID, etc. The workflow further includes a step of on-chain verification, wherein network nodes validates the signature against the public key recorded on the blockchain, and if valid, the smart contract checks the access policies in order to determine if the request should be granted. The workflow further includes a step of logging and monitoring, wherein any authentication attempt, whether successful or failed, are immutably recoded on the blockchain network, wherein administrator can review the logs through a dashboard provided within the user interface of the system, wherein this enables swift anomaly detection and auditing.

The key features of the proposed blockchain-based authentication system are described as under:

Decentralization: The system employs a consortium blockchain, enabling it to distribute authentication tasks among multiple nodes representing different stakeholders. This eliminates the need for a single centralized server and significantly reduces the risk of large-scale breaches. In addition, peer-to-peer validation ensures that no single entity can unilaterally manipulate device credentials.

Security: The proposed system is integrated with cryptographic mechanisms such as public-key infrastructure (PKI), hashing, and digital signatures, in order to provide robust security. The devices use hardware security modules to store private keys, minimizing attack surfaces. The immutable blockchain ledger serves as a tamper-proof record of registration and access events, disincentivizing fraudulent activities.

Privacy: The system employs pseudonymization to protect user data, ensuring that sensitive information—such as personal identifiers or exact travel routes—are not directly stored on the blockchain. Where necessary, zero-knowledge proofs or off-chain encryption can be integrated to facilitate advanced privacy needs. As a result, the system meets stringent data protection requirements while still providing transparent and verifiable records.

Scalability: The proposed system is configured to leverage scalable consensus algorithms for handling growing number of EVs and drones. The system is further integrated with Layer-2 solutions, like sidechains or state channels, which further reduce on-chain transaction load by processing routine authentication checks off-chain, committing only critical data to the blockchain. This modular approach facilitates gradual scaling in tandem with the expansion of the smart city infrastructure.

In an exemplary embodiment, an authentication system is developed for drone delivery service operating in a metropolitan area. Herein, when a drone requests permission to fly in a restricted zone, it generates a digitally signed request. The blockchain network verifies the drone's identity and checks whether its credentials permit entry into that airspace. If approved, the system logs the event on-chain, offering real-time transparency to city administrators. This same mechanism applies to EVs at charging stations, confirming device identity before billing transactions.

Both functional and non-functional requirements are needed for designing an authentication system for EVs and drones. The functional requirements includes Registration of devices on the blockchain, secure issuance of credentials, real-time authentication, access control logic via smart contracts, and robust logging for auditing. The non-functional requirements includes high availability, low latency, scalability to support mass adoption, fault tolerance, and compliance with data protection regulations such as the General Data Protection Regulation (GDPR). These requirements were gathered through a review of best practices in blockchain, vehicular networks, and unmanned aerial systems, as well as stakeholder interviews with EV manufacturers, drone operators, and city administrators.

Figure 4:
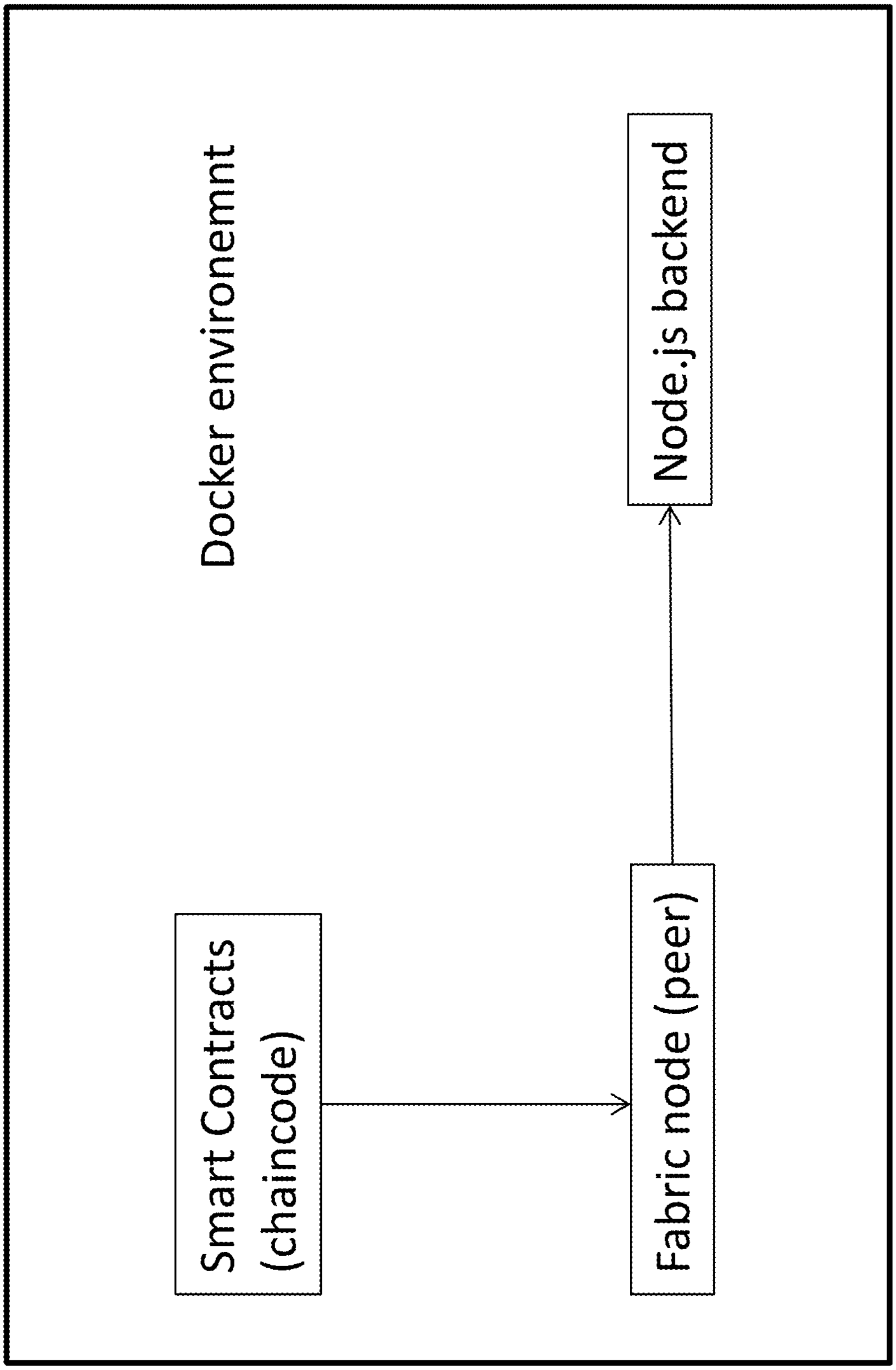
FIG. 4 illustrates a diagram showing prototype implementation in accordance with an embodiment of the present disclosure.

FIG. 4 illustrates a diagram showing prototype implementation in accordance with an embodiment of the present disclosure.

In an embodiment, a prototype of the proposed authentication system is developed using hyperledger fabric blockchain platform due to its flexible permissioned model and modular architecture. The developed environment included: hyperledger fabric which manages the distributed ledge, smart contract (chaincode), and membership services; Node.js backend which implements the off-chain business logic and user interface for device management and monitoring; and a docker container which facilitates the creation of an isolated, reproducible test environment, where each blockchain node runs in a separate container. The key components of the said embodiment is illustrated in FIG. 4, wherein that chaincode handles the registration, key issuance, and access control, while Node.js backend provides RESTful endpoints for device communication. Each component is containerized to streamline testing and deployment. The said prototype is underwent testing and validation, wherein multiple testing phases are included, such as security tests, performance tests, and scalability tests. The security tests include simulation of spoofing, replay, and man-in-the-middle attacks to verify the system's resilience, wherein attempts to use invalid credentials or manipulate on-chain data were logged and analyzed. The performance tests include evaluation of transaction latency, throughput, and resource consumption (CPU, memory), wherein load tests with up to 1,000 concurrent authentication requests was performed to gauge scalability. The scalability tests include incrementally increased the number of blockchain peers, simulating additional city authorities or service providers, wherein system's ability to maintain consensus and low latency was observed.

The data collection and analysis during the aforementioned testing includes the following:

Transaction logs: Timestamped records of successful and failed authentication requests, stored on-chain.

Resources metrics: CPU, memory, and network usage, monitored in real time via containerization tools.

Security incidents: Recorded attempts at spoofing or unauthorized access, including details on attack vectors and system responses.

The analysis involved aggregating metrics from log files and generating statistical measures such as average transaction latency, authentication success rates, and system through put. The results formed the basis for the performance evaluation is described below.

Figure 5:
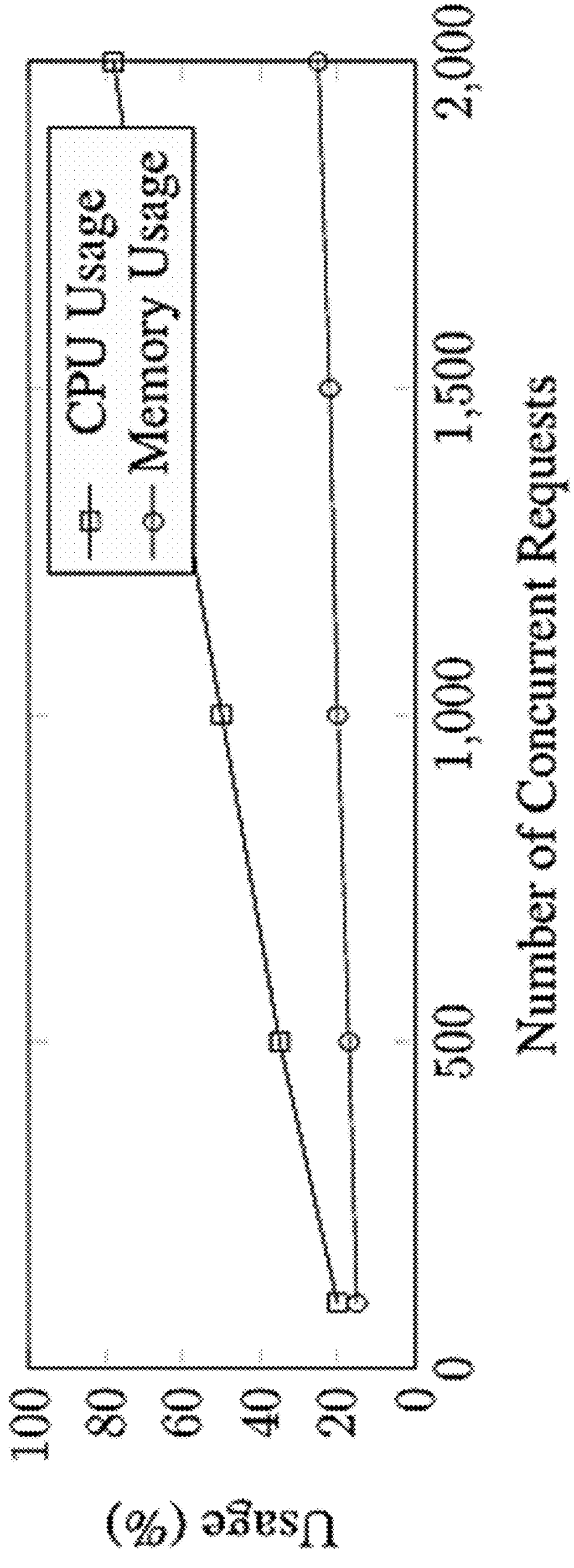
FIG. 5 illustrates graphical representation of CPU and memory usage for different load levels, in accordance with an embodiment of the present disclosure.
Figure 6:
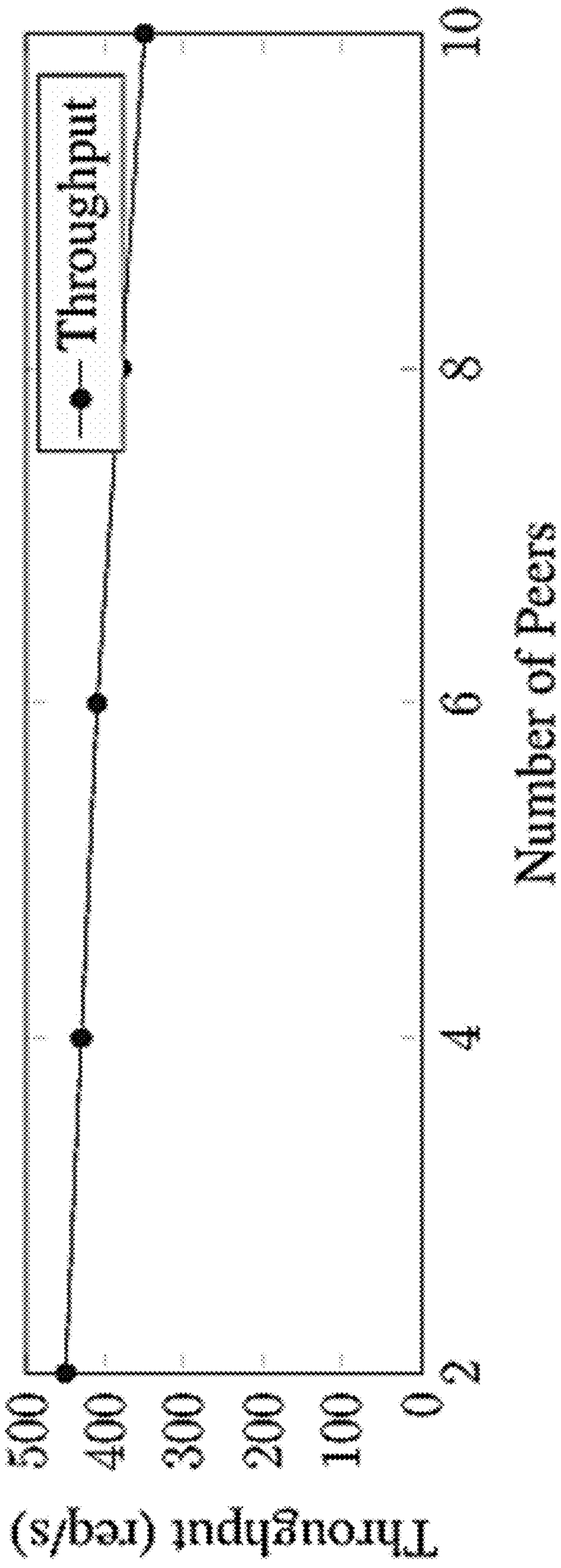
FIG. 6 illustrates graphical representation of throughput vs. number of peers, respectively in accordance with an embodiment of the present disclosure.

FIG. 5 and FIG. 6 illustrates graphical representation of CPU and memory usage for different load levels, and throughput vs. number of peers, respectively in accordance with an embodiment of the present disclosure.

The results from the testing and evaluation of the aforementioned prototype focuses on the outcomes of the prototype implementation and testing, focusing on authentication performance, security assessment, scalability, and a comparative analysis with existing systems.

FIG. 7 illustrates a table describing the average latency and throughput measured during tests with increasing numbers of concurrent authentication requests. Latency refers to the time required from initiating an authentication request to its validation on the blockchain, while throughput denotes the number of authentication requests processed per second.

As shown in Table in FIG. 7, the system maintains relatively stable throughput even as the load increases from 100 to 2,000 concurrent requests. The rise in latency remains within acceptable ranges for non-real-time applications such as EV charging, where a few seconds of delay is tolerable. However, drone applications with strict real-time constraints may need further optimizations, such as implementing layer-2 scaling mechanisms or reducing consensus overheads Referring to FIG. 5, the results from the CPU and memory usage across different load scenarios revealed that in general, CPU usage increased proportionally with the number of requests, reflecting the computational intensity of cryptographic operations and consensus mechanisms. Memory usage remained stable, suggesting that the system can scale primarily by adding more nodes rather than requiring significant hardware upgrades.

The security testing is focused on the ability of the system to resist spoofing, replay, and man-in the-middle attacks. In all test scenarios, unauthorized credential usage was detected and rejected by the blockchain's consensus layer, as any change to device credentials or registration data required majority agreement. Additionally, the use of cryptographic nonces and timestamps thwarted replay attacks by invalidating stale authentication requests.

FIG. 8 illustrates a Table highlighting the key security metrics observed, wherein notably, no successful spoofing or unauthorized access occurred during the tests, suggesting that the combination of public-key cryptography, immutable ledgers, and smart contract logic effectively safe guards against these threats.

In order to evaluate scalability, additional Hyperledger Fabric peers were introduced to simulate multiple city authorities. Although increasing the network size raised consensus overhead, the overall transaction throughput and latency remained within acceptable limits for most smart city scenarios. Future implementations could explore consensus algorithms like Practical Byzantine Fault Tolerance (PBFT) or Proof of Authority (PoA) for improved scalability and reduced energy consumption.

FIG. 6 demonstrates a gradual decrease in throughput as more peers participate in the network. Despite this decline, the performance of the system remained sufficient for many real-world use cases, indicating that the proposed model can handle larger deployments by balancing the trade-off between decentralization and performance.

FIG. 9 illustrates a Table showing the comparative analysis between the proposed solution and several existing authentication systems. Traditional centralized methods often exhibit high throughput but are vulnerable to single points of failure and data breaches. Some recent distributed approaches leverage edge computing for localized authentication, improving latency but still relying on a central authority for credential management.

Table in FIG. 9 illustrates that the proposed system excels in security and privacy due to cryptographic protection and decentralized consensus. Its scalability is moderate to high, con strained primarily by the performance of the underlying blockchain platform. In contrast, centralized approaches are easier to implement but weaker in resilience and privacy.

The result from the developed prototype of the proposed blockchain based authentication system revealed that the proposed blockchain-based solution for authentication is viable for secure and private authentication of EVs and drones in smart cities. By leveraging blockchain's decentralized consensus and immutable ledger, the system eliminates much vulnerability inherent in centralized architectures. This reliability fosters trust among stakeholders—including city agencies private service providers, and end-users—that the authentication process is both transparent and tamper-resistant. For EVs, the approach streamlines charging authorization and billing, ensuring that only registered vehicles can access charging stations. Similarly, drones can securely obtain flight permissions, with the entire process logged on an immutable ledger. Over time, these capabilities can be extended to other smart city services, such as public transportation or shared micromobility platforms, creating a unified digital identity framework for urban mobility.

The proposed blockchain-based authentication system presents several technical challenges that must be addressed for widespread deployment. One key challenge is blockchain scalability, as permissioned blockchains can still experience performance bottlenecks under high transaction loads. Implementing solutions such as sharding or layer-2 protocols may be necessary for large-scale smart city deployments. Another concern is energy consumption, as consensus mechanisms like Proof of Work are known to be energy-intensive. While permissioned platforms such as Hyperledger Fabric help mitigate this issue to some extent, further research is needed to optimize energy usage for large-scale real-world implementations. Additionally, legacy system integration poses a significant hurdle, as many municipalities operate with outdated infrastructures that do not support blockchain interactions. Developing robust application programming interfaces (APIs) and data gateways will be essential for seamless integration. Lastly, network reliability is a crucial factor, particularly for drones that may operate in environments with intermittent connectivity. To address this, mechanisms such as offline authentication or cached credentials could be explored to mitigate connectivity disruptions.

While the primary focus of the present disclosure is on EV and drone authentication, the underlying principles and architecture of proposed blockchain-based authentication system can be extended to other domains. In healthcare, blockchain-based patient identity management could ensure secure access to electronic health records, reducing medical fraud and improving data privacy. Similarly, e-governance could benefit from decentralized identity frameworks that authenticate citizens accessing public services, enhancing transparency and trust in governmental processes. Additionally, supply chain management could leverage similar authentication mechanisms to verify the origin and authenticity of goods, thereby improving traceability and reducing counterfeiting. These broader applications highlight the flexibility and adaptability of decentralized authentication mechanisms. By addressing existing challenges and incorporating future enhancements, blockchain-based solutions have the potential to become integral components of secure and efficient digital infrastructures across various industries.

The obtained results underscore the feasibility of decentralized identity management in complex, large-scale deployments. The proposed disclosure contributes to the existing body of knowledge by offering a unified system that can authenticate heterogeneous devices—from EVs connecting to charging stations to drones requesting airspace access—under a single architectural umbrella. The mentioned working prototype provides empirical evidence of the system's efficacy. Additionally, the analysis of resource usage, scalability metrics, and security tests offers valuable insights for further blockchain-based solutions to be developed for urban infrastructure. The system still faces notable challenges related to blockchain scalability, energy consumption, and integration with legacy infrastructures. These obstacles present avenues for future work, including the exploration of advanced consensus algorithms, lightweight blockchain protocols, and AI-driven security enhancements. Broader applications of the proposed framework span healthcare, e-governance, and supply chain management, indicating the potential for blockchain-based authentication to serve as a cornerstone for next-generation digital ecosystems.

The present disclosure provides a decentralized, blockchain-based authentication system can provide significant advantages over traditional, centralized methods in terms of security, privacy, and trust. As smart city initiatives continue to evolve, such solutions are likely to play an increasingly critical role in ensuring the safe and efficient deployment of emerging technologies like electric vehicles and drones. By addressing the outlined challenges and embracing future enhancements, stakeholders can pave the way for more resilient, transparent, and inclusive urban infrastructures.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A blockchain-based authentication system for authenticating an electric vehicle (EV) or a drone in a smart city, comprising:

- a consortium blockchain network managed by a plurality of registered users, said consortium blockchain network configured to store records of authorized device identities;
- a plurality of smart contracts coupled to the consortium blockchain network configured to implement identity registration, credential issuance, and access control logic for devices within the smart city environment, said smart contracts comprising:
  - a registration module configured to register a device on the consortium blockchain network, create a unique device identity, and generate a corresponding public-private key pair; and
  - a credential issuance module, implemented by smart contracts coupled to the blockchain network, configured to issue credentials linking the device's public key to its registered identity, and store the credentials on a cloud server;
- a plurality of device nodes coupled to the plurality of smart contracts, each device node comprising a vehicle or a drone, said device node configured to operate as a node in the consortium blockchain network and include an onboard module for secure key storage and blockchain interaction;

an authentication server interconnected to the consortium blockchain network and the plurality of device nodes and configured to perform off-chain interactions, including data analytics, without undermining decentralized authentication logic implemented by the consortium blockchain network and smart contracts;

wherein said authentication server comprising:

an authentication request module, coupled to the device, configured to generate an authentication request by signing the request using the device's private key and attaching metadata;

an on-chain verification module, coupled to the network nodes of the blockchain network and implemented by smart contracts, configured to grant or deny access based on a generated authentication result, wherein said authentication result is generated upon validating a digital signature of the authentication request against the public key recorded on the blockchain network; and a user interface connected to the consortium blockchain network to manage device credentials, monitor system status within the consortium blockchain network, and interact with the authentication system, wherein the metadata attached to the authentication request by the authentication request module comprises time stamps and a device identifier, wherein the on-chain verification module receives the authentication request and the digital signature from the electric vehicle/drone, and retrieves the public key associated with the electric vehicle or drone from the blockchain network thereby calculates a first cryptographic hash of the authentication request to decrypt the digital signature using the retrieved public key to obtain a second cryptographic hash and compare the first cryptographic hash with the second cryptographic hash thereby determines the validity of the authentication request based on the comparison result, wherein the authentication request is validated if the first cryptographic hash matches the second cryptographic hash; and wherein the authentication server further comprises a state transition controller configured to enforce sequential state evaluation of authentication outcomes, comprising: maintaining a local authentication session table for each device identifier containing state flags for signature verification, metadata validation, nonce uniqueness, and credential expiry status; initializing all state flags to an indeterminate state upon receipt of an authentication request; setting the signature verification flag only if a signature digest computed from the request matches a digest reconstructed using the public key stored on-chain; setting the metadata validation flag only if the device's identifier, timestamp, and context parameters align with those registered in the blockchain's access mapping structure; and only transmitting an approval response to the requesting node if all flags are marked valid within a single authentication cycle and the session table reflects no pending invalidation events.

2. The system of claim 1, further comprising:

a logging and monitoring module configured to immutably record authentication attempts on the blockchain network and provide a registered user access to review logs for anomaly detection and auditing, wherein the blockchain network operates using a consensus mechanism selected from the group consisting of Proof of Stake (POS), Byzantine Fault Tolerance (BFT), Proof of Authority (PoA), or any hybrid mechanism optimizing for security, energy efficiency, and scalability, and wherein the consortium blockchain network further comprises a distributed ledger configured to record device data and access control information; and an off-chain backend module communicatively coupled to a granted blockchain platform and configured to implement business logic for device management and monitoring, and provide the user interface for device management and monitoring, wherein the granted blockchain platform further comprises membership services for managing registered users in the granted blockchain network, and wherein the access can be granted or denied based on a set of predefined authentication policies, wherein said policies are selected from a group of a user with registered EVs/drones with valid digital certificates or unique identifiers, the user of the EV/drone must provide valid credentials linked to their registered identity, different roles have varying levels of access to system resources and functionalities, access is granted or denied based on the time of day or day of the week and based on the EV/drone's location, access is influenced by the device's or user's past transaction history and reputation score, and access may be restricted based on the health and status of the EV/drone.

3. The system of claim 1, further comprising:

at least one machine learning model, operably coupled to the blockchain data interface and configured to receive authentication data from the blockchain data interface, analyze the authentication data to establish a baseline of normal authentication patterns, and detect deviations from the baseline indicative of anomalous authentication patterns; and an anomaly detection output module, operably coupled to the at least one machine learning model and configured to generate an alert in real-time upon detection of anomalous authentication patterns, wherein the authentication data comprises transaction patterns, user behavior patterns, access patterns, or a combination thereof within the blockchain, wherein the anomaly detection output module is further configured to generate an alert comprising details of the anomalous authentication pattern, selected from stored timestamps, user identifiers, and transaction details; and an action module, operably coupled to the anomaly detection output module, and configured to automatically trigger a security action in response to the generated alert.

4. The system of claim 1, wherein the registration module is configured to initiate a device registration sequence comprising:

generating a blockchain-based nonce using a deterministic pseudorandom function linked to a block header hash of the latest confirmed block;

transmitting the nonce to the device node over a secure channel established using the Transport Layer Security (TLS) protocol with mutual authentication; receiving, from the device node, a signed nonce response generated by encrypting the nonce using a private key stored in a hardware security module (HSM) within the device node;

verifying the authenticity of the signed nonce response by invoking a smart contract that retrieves the public key associated with the device identity from the blockchain ledger and performs an elliptic curve digital signature verification (ECDSA) operation; and permitting registration completion only upon successful validation of the signature, the integrity of a firmware hash transmitted during registration, and correlation of the device identifier with a manufacturer-issued root certificate stored on-chain.

5. The system of claim 1, wherein the credential issuance module is configured to issue credentials using a smart contract-based Merkle proof generation logic, comprising: receiving, from a registered authority node, a credential issuance request comprising a device public key and a set of contextual parameters including permitted geographic zones, time ranges, and operational modes;

generating a Merkle tree structure wherein each leaf node encodes a hash of a specific contextual parameter, computing a Merkle root which is cryptographically committed to a blockchain block by invoking a credential-anchoring smart contract, generating a Merkle proof associated with the issued credential and delivering said proof to the device node via an encrypted off-chain channel; and configuring the on-chain verification module to validate the credential by reconstructing the Merkle root from the submitted Merkle proof during the authentication request and comparing the reconstructed root with the committed Merkle root stored in the blockchain.

6. The system of claim 3, wherein the machine learning model comprises a federated recurrent neural network (RNN) with gated recurrent units (GRUs) deployed on each edge device node, wherein each node locally trains its GRU-based model on temporal sequences of authentication transactions comprising tuples of timestamp, success/failure status, user role, location hash, and device signal quality index, wherein the local model parameters are encrypted using a homomorphic encryption scheme prior to transmission, and wherein a smart contract on the blockchain coordinates secure model aggregation using a verifiable computation protocol, said protocol including: (a) selecting aggregating nodes based on stake-weighted randomness;

(b) verifying zero-knowledge proofs attached to each encrypted model update;

(c) computing an aggregated model via homomorphic addition;

(d) updating the global model commitment stored on-chain with a new model hash committed by a smart contract that checks aggregation consistency using modular arithmetic integrity constraints, and wherein the anomaly detection output module is configured to compute anomaly scores in real-time using a temporal convolutional network (TCN), wherein input to the TCN includes fixed-length authentication event sequences extracted using a sliding window mechanism over blockchain transaction logs, wherein each sequence is normalized using z-score normalization applied to timestamp deltas, location entropy metrics, and user access frequency;

wherein the TCN output layer produces a probabilistic anomaly score vector, and a softmax function is used to determine classification probabilities for “normal” and “anomalous” states, wherein anomaly thresholds are not fixed but learned via reinforcement learning policies which adjust threshold levels dynamically based on false-positive feedback received through a blockchain-based feedback channel linked to end-user device confirmations, and wherein alerts are generated only when the anomaly classification confidence exceeds an adaptive alerting threshold maintained in a smart contract-based configuration registry.

7. The system of claim 5, wherein the smart contract associated with the credential issuance module is configured to generate a time-constrained authorization credential by: initiating a credential creation subroutine upon receiving a validated registration transaction; hashing the device public key with a salt derived from a recent block timestamp and a device class identifier; encoding the resulting hash and an expiry block number into a signed credential payload using the ECDSA algorithm and the private key of a trusted authority node; writing the signed credential hash to a credential registry mapping in the blockchain state, indexed by the device ID, and returning a transaction event comprising the signed credential payload and credential metadata for off-chain retrieval and device-side caching, and wherein the credential issuance module is configured to generate access credentials through a blockchain-triggered issuance flow comprising: invoking a credential generation routine in response to a successful device registration event emitted by the smart contract; constructing a credential payload including device identity, permitted operational zones, temporal validity parameters, and a random challenge token generated by combining recent block metadata and a device-specific entropy value; applying a key-based signing operation to the payload using a private signing key stored within a hardware-trusted node of the network; storing the resulting signed credential in a distributed ledger field mapped to the device identifier, and emitting a blockchain event with the credential reference; and configuring the smart contract to reject future credential re-issuance attempts within a defined block window to prevent duplication or replay attempts.

8. The system of claim 5, wherein the smart contracts implementing the access control logic are configured to dynamically interpret conditional access rules, comprising: receiving an authentication request embedded with timestamp, device ID, user role, and location metadata; retrieving access policy conditions associated with the device role from an on-chain rules registry, said conditions structured as a sequence of nested logical expressions; evaluating each expression using runtime metadata from the authentication request and on-chain parameters, wherein failure of any mandatory condition short-circuits the evaluation chain; executing additional conditional branches only when prior conditions marked as “pre-conditions” are satisfied, such that policy execution proceeds in a depth-first order of dependency; and returning an access grant token only when all applicable conditions within the execution path resolve as true, otherwise emitting a denial event with an encoded evaluation trace.

9. The system of claim 1, wherein the authentication server is configured to validate incoming authentication requests by executing a multi-phase validation process, comprising: validating the freshness of the request timestamp by comparing it against the current time offset derived from blockchain block timestamps, checking the uniqueness of the attached metadata token against a nonce history table stored off-chain and synchronized with the smart contract state to prevent replay, retrieving the device’s public key from the blockchain using its identifier and verifying that the submitted metadata matches the registered key context, computing a verification output by comparing a derived hash of the submitted authentication payload with a hash derived from the decrypted signature using the registered key, and only marking the request as authenticated when all prior comparisons succeed and the metadata token has not been previously used within the current authentication cycle.

10. The system of claim 4, wherein the machine learning model is trained using decentralized data across a plurality of nodes without central aggregation of raw data, comprising: initiating local training sessions on participating nodes using device-specific authentication event logs, each event log structured as time-series sequences of access attempts including metadata tuples; generating updated local model parameters based on the event logs without transmitting those logs outside the device boundary, encrypting the parameter updates using a shared secret derived from a blockchain-validated session key agreement, submitting the encrypted model updates to a coordination smart contract which aggregates contributions and verifies structural integrity of each update via a consistency check procedure, and producing a global update token committed on-chain that includes a reference to the aggregated result and a list of contributing device node identifiers.

11. The system of claim 3, wherein the anomaly detection output module is configured to continuously monitor authentication activity and flag patterns deviating from learned sequences, comprising: capturing sequential access metadata windows across fixed time intervals, each window representing a vector of values including access frequency, time-of-day, device health status, and success ratio; comparing incoming metadata windows to baseline behavioral profiles pre-learned from historical data, using a similarity scoring function computed locally at the edge; assigning an anomaly likelihood score to each sequence window based on divergence from expected value ranges and sequence order; and generating a system alert if the anomaly score exceeds a dynamically adjusted threshold, said threshold calibrated during operation based on feedback derived from confirmed true-positive and false-positive cases linked to downstream access events.

12. The system of claim 1, wherein each device node is further configured to initiate a secure compromise broadcast sequence upon detection of a local anomaly or breach, comprising: detecting tamper or compromise conditions based on predefined thresholds for unusual authentication attempts, invalid credential requests, or erratic metadata fluctuations; constructing a broadcast payload that includes a timestamp, device identifier, event code, and a cryptographically signed emergency revocation request; transmitting the payload to at least three neighboring nodes within the consortium network, and upon receipt of at least two confirmations from peer nodes, triggering an on-chain smart contract that updates the revocation list mapping and temporarily disables all credentials associated with the device's identifier for a preconfigured quarantine period.

13. The system of claim 5, wherein the smart contract responsible for managing active credentials is further configured to enforce credential invalidation via consensus-triggered revocation, comprising: receiving revocation requests submitted by authorized consortium members, each request containing a justification code and a reference to the target device credential; recording each request in an on-chain revocation proposal log and assigning a unique revocation ID; initiating a timed voting phase wherein each registered member node submits a vote for or against revocation, tied to the revocation ID and authenticated via its node credentials; tallying votes after expiration of the voting phase duration and revoking the credential only if the number of affirmative votes exceeds a predefined approval threshold; and updating the revocation registry on-chain to reflect the revocation status and enforce denial of all future authentication attempts using the revoked credential.

14. The system of claim 1, wherein the access control logic implemented by the smart contract is further configured to enforce multi-tier access levels across device types and user roles, comprising: retrieving the current user role and device class associated with the authentication request; mapping the role and device class to a tiered access level by referencing an access tier matrix stored on-chain, wherein each cell of the matrix defines permitted operations for a given role-device pair; validating the requested operation within the access request against the mapped tier definition; and permitting or rejecting the operation based on whether the operation is included within the authorized action set defined for the current tier, and further storing the result of the access attempt in a tiered access log table used for generating aggregate access heatmaps for policy optimization, and wherein the access control logic evaluates temporal access constraints using a real-time blockchain time oracle, comprising: querying a decentralized time service embedded in the blockchain consensus layer to obtain a network-synchronized current block timestamp; comparing the timestamp embedded in the authentication request against both the minimum and maximum allowed time ranges defined in the access policy object; applying a grace period delta to compensate for block propagation delays, and allowing the authentication to proceed only if the timestamp of the request falls within the extended window, wherein policy violations outside the window are logged with a temporal error code for audit tracing.

15. The system of claim 4, wherein the authentication server and on-chain verification module are cooperatively configured to execute a multi-phase adaptive authentication delay protocol in response to detected abnormal behavioral signatures, comprising: receiving, at the anomaly detection output module, a classification score associated with a current authentication request, said score derived from sequential deviation patterns of recent access attempts linked to the same device or user identity; evaluating the score against a dynamic suspicion threshold maintained in a time-weighted suspicion scoring model that incorporates historical confidence values and system-wide anomaly frequency metrics; initiating a delay trigger if the score exceeds the suspicion threshold but does not surpass a critical anomaly cutoff level, said trigger comprising a wait instruction issued to the requesting device via the authentication request module, calculating the wait duration based on a compounded function of the deviation magnitude, system congestion level, and current time proximity to previously denied requests; recording the delayed authentication event in a temporary buffer ledger synchronized with the blockchain network, and re-invoking the on-chain verification logic upon expiry of the wait duration to resume authentication flow, wherein successful post-delay authentication results are weighted to lower future suspicion scores, and failed authentications are escalated to a revocation review module for further action.

16. A blockchain-based authentication method for authenticating an electric vehicle (EV) or a drone in a smart city environment implemented by the system as claimed in claim 1, the method comprising:

storing records of authorized device identities on a consortium blockchain network managed by a plurality of registered users;

registering a device on a blockchain network, creating a unique device identity, and generating a corresponding public-private key pair;

issuing credentials, using a plurality of smart contracts coupled to the blockchain network, that link the device's public key to its registered identity, and storing the credentials on a cloud server;

operating a plurality of device nodes, each device node comprising a vehicle or a drone, as nodes within the consortium blockchain network;

securing key storage and blockchain interaction at each device node using an onboard module;

performing off-chain interactions, including data analytics, using an optional authentication server, wherein the off-chain interactions do not undermine decentralized authentication logic implemented by the consortium blockchain network and smart contracts;

generating an authentication request at the device by signing the request using the device's private key and attaching metadata using an authentication request module;

granting or denying access based on a generated authentication result by using an on-chain verification module, wherein said authentication result is generated upon verifying the authentication request on-chain by validating a digital signature of the authentication request against the public key recorded on the blockchain network by network nodes;

logging the authentication attempt on the blockchain network;

immutably recording authentication attempts on the blockchain network and providing the registered user access to review logs for anomaly detection and auditing; and managing device credentials, monitoring system status within the consortium blockchain network, and interacting with the authentication system via a user interface by the registered user.

17. The method of claim 16, wherein identity registration comprises:

generating a unique cryptographic identity for each electric vehicle and drone;

storing the identity on the blockchain ledger using the smart contract; and issuing a blockchain-based credential to the registered device;

wherein the authentication process includes:

receiving an authentication request from the electric vehicle or drone;

validating the request through smart contract execution; and granting or denying access based on a set of predefined authentication policies, wherein said policies are selected from a group of a user with registered EVs/drones with valid digital certificates or unique identifiers, the user of the EV/drone must provide valid credentials linked to their registered identity, different roles have varying levels of access to system resources and functionalities, access is granted or denied based on the time of day or day of the week and based on the EV/drone's location, access is influenced by the device's or user's past transaction history and reputation score, and access may be restricted based on the health and status of the EV/drone.

18. The method of claim 16, further comprising:

detecting unauthorized access attempts through anomaly detection mechanisms embedded in the blockchain; and notifying administrators via the user interface when a security breach is detected;

managing a distributed ledger to record device data and access control information;

operating an off-chain backend module communicatively coupled to the granted blockchain platform, the off-chain backend module:

implementing business logic for device management and monitoring, and providing the user interface for device management and monitoring.

19. The method of claim 16, further comprising detecting suspicious authentication patterns in blockchain data using at least one machine learning model, comprising:

accessing and receiving authentication data from the blockchain via a blockchain data interface;

analyzing the authentication data using the at least one machine learning model to establish a baseline of normal authentication patterns;

detecting deviations from the baseline using the at least one machine learning model, wherein the deviations are indicative of anomalous authentication patterns; and generating an alert in real-time upon detection of anomalous authentication patterns;

automatically triggering a security action in response to the generated alert; and detecting deviations in real-time is performed by continuously or periodically analyzing incoming authentication data against the established baseline.

* * * * *